(12) United States Patent
Rodriguez

(10) Patent No.: US 10,173,507 B2
(45) Date of Patent: Jan. 8, 2019

(54) HARD TOP STRUCTURE FOR A VEHICLE HAVING A ROLL-BAR CAGE

(71) Applicant: Eddie Rodriguez, Holly Springs, NC (US)

(72) Inventor: Eddie Rodriguez, Holly Springs, NC (US)

( * ) Notice: Subject to any disclaimer, the term of this patent is extended or adjusted under 35 U.S.C. 154(b) by 0 days.

(21) Appl. No.: 15/457,321

(22) Filed: Mar. 13, 2017

(65) Prior Publication Data

US 2018/0257467 A1    Sep. 13, 2018

(51) Int. Cl.
| | | |
|---|---|---|
| *B60J 7/10* | (2006.01) | |
| *B60J 7/11* | (2006.01) | |
| *B60J 1/08* | (2006.01) | |
| *B60J 1/18* | (2006.01) | |

(52) U.S. Cl.
CPC ............. *B60J 7/106* (2013.01); *B60J 1/085* (2013.01); *B60J 1/1838* (2013.01); *B60J 7/11* (2013.01)

(58) Field of Classification Search
CPC . B60J 7/106; B60J 1/085; B60J 1/1838; B60J 7/11
USPC ....................... 296/102, 218, 216.07, 216.09
See application file for complete search history.

(56) References Cited

U.S. PATENT DOCUMENTS

| | | | |
|---|---|---|---|
| 3,954,150 A * | 5/1976 | Cole ..................... | B60R 21/11 180/89.12 |
| 5,738,405 A | 4/1998 | Richters et al. | |
| 5,992,917 A | 11/1999 | Hilliard et al. | |
| 6,189,962 B1 * | 2/2001 | Henderson ............. | B60J 7/11 280/756 |
| 6,851,739 B2 | 2/2005 | Morley | |
| 8,622,457 B1 * | 1/2014 | McIntire ................ | B60J 7/106 280/756 |

\* cited by examiner

*Primary Examiner* — Joseph D. Pape
(74) *Attorney, Agent, or Firm* — Smith Anderson, LLP

(57) ABSTRACT

A hard top structure for a vehicle having a roll-bar cage is provided. In one exemplary embodiment, the hard top structure may include a frame adapted to overlay on and attach to the roll-bar cage. The frame may include an upper frame member that defines one or more upper frame openings. Further, the upper frame member may have a channel member that extends around at least a portion of each upper frame opening. The hard top structure may also include one or more upper frame panels with each corresponding to one of the upper frame openings. Each upper frame panel may have an insert member that extends around at least a portion of a perimeter of that panel. Also, each upper frame panel may be positioned in one of the upper frame openings so that the corresponding insert and channel members form a seal joint.

20 Claims, 22 Drawing Sheets

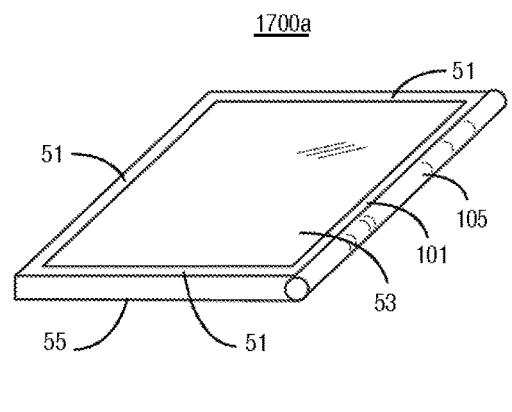
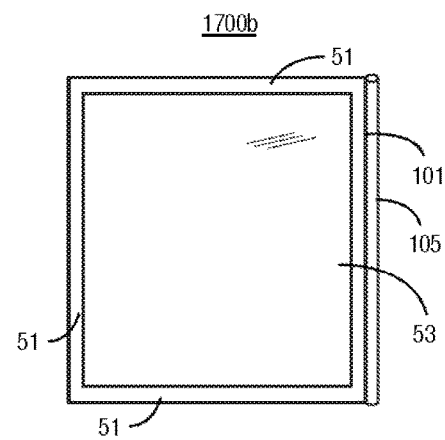
FIG. 17A  FIG. 17B
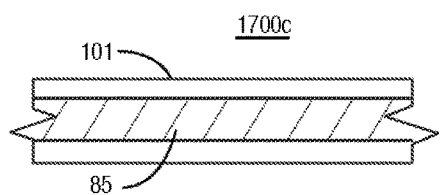
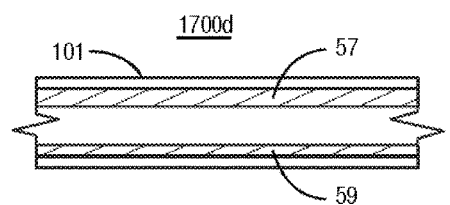
FIG. 17C  FIG. 17D
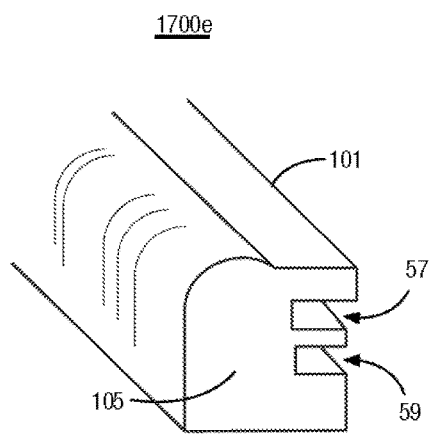
FIG. 17E

HARD TOP STRUCTURE FOR A VEHICLE HAVING A ROLL-BAR CAGE

FIELD OF DISCLOSURE

The present disclosure relates generally to vehicles, and in particular to a hard top structure for a vehicle having a roll-bar cage.

BACKGROUND

Contemporary hard tops having removable window panels such as for a Jeep-type utility vehicle require substantial handwork to place and/or remove the window panels from the vehicle. Further, such systems require substantial space for storing the window panels since each window panel is typically multiple inches thick. Also, a hard top does not provide the open-air environment that is provided by a Jeep-type utility vehicle without a hard top or with a soft top that is in a stored position or removed. In addition, a hard top-soft top combination system requires that the soft top must be placed in a stored position or removed from the vehicle when the hard top is placed on the vehicle. Accordingly, there is a need for improved hard top structures for a vehicle having a roll-bar cage. Further, there is a need for improved techniques for reducing the amount of space required to store the window panels. Also, there is a need for improved techniques to provide an open-air environment without requiring a hard top-soft top combination system. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to hard top structure for a vehicle having a roll-bar cage. According to one aspect, a hard top structure adapted to attach to a vehicle having a roll-bar cage may include a frame adapted to overlay on and attach to the roll-bar cage of the vehicle. The frame may include an upper frame member that defines one or more upper frame openings. Further, the upper frame member may have a channel member that extends around at least a portion of each upper frame opening. The hard top structure may also include one or more upper frame panels with each corresponding to one of the upper frame openings. Each upper frame panel may have an insert member that extends around at least a portion of a perimeter of that panel. Also, each upper frame panel may be positioned in one of the upper frame openings so that the corresponding insert and channel members form a seal joint.

According to another aspect, the channel member may include a rounded portion that is adapted to attach to the insert member. Also, the insert member may include a rounded portion that is adapted to fit in and attach to the rounded portion of the channel member.

According to another aspect, the channel or insert member may include a sealant that extends along a perimeter of the rounded portion of that member so that the sealant is disposed between the channel and insert members to form the seal joint.

According to another aspect, the channel and insert members when attached to form the seal joint may include a channel aperture above the seal joint. The channel aperture may allow a flow of fluid along at least the portion of the perimeter of the panel.

According to another aspect, the upper frame member may include an outlet port disposed in the channel member and adjacent the channel aperture so that any fluid in the channel aperture may flow from the channel aperture and out the outlet port.

According to another aspect, the upper frame member may be angled so that any fluid in the channel aperture can flow from the channel aperture and out the outlet port under the force of gravity.

According to another aspect, the seal joint may be a compression seal joint.

According to another aspect, the upper frame member may include one or more fasteners for attaching the one or more panels to the frame member.

According to another aspect, each of the one or more fasteners may be a latch that, when in a first configuration, may be adapted to attach the channel and insert members to form the seal joint, and that, when in a second configuration, may be adapted to detach the channel and insert members.

According to another aspect, a maximum height of each upper frame panel may be no more than one inch.

According to another aspect, the frame may further include a rear frame member that defines one or more rear frame openings. The rear frame member may have a channel member that extends around at least a portion of each rear frame opening. The frame may also include a rear frame panel for each rear frame opening with each rear frame panel having an insert member that extends around at least a portion of a perimeter of that panel. Further, each rear frame panel may be positioned in one of the rear frame openings so that the corresponding insert and channel members form a seal joint.

According to another aspect, a maximum height of each rear frame panel may be no more than one inch.

According to another aspect, a combined maximum height of the upper and rear frame panels may be no more than three inches when stacked.

According to another aspect, a combined maximum height of the upper and rear frame panels may be no more than five inches when stacked.

According to another aspect, the frame may further include one or more side frame members with each defining one or more side frame openings. Each side frame member may have a channel member that extends around at least a portion of a corresponding side frame opening. The frame may also include a side frame panel for each side frame opening. Each side frame panel may have an insert member that extends around at least a portion of a perimeter of that panel. Further, each side frame panel may be positioned in one of the side frame openings so that the corresponding insert and channel members form a seal joint.

According to another aspect, a maximum height of each side frame panel may be no more than one inch.

According to another aspect, each insert member may define a panel opening. Further, each insert member may have a first groove that extends around at least a portion of each panel opening. The first groove may be adapted to attach a top cover.

According to another aspect, each insert member may include a second groove that extends around at least a portion of the panel opening. The second groove may be adapted to attach a bottom cover.

According to another aspect, the top cover may be a sunroof and the bottom cover may be a shade.

According to another aspect, the upper frame member may further include a second channel member that extends around at least a portion of each upper frame opening. Further, each upper frame panel may include a second insert member that extends around at least a portion of a perimeter of that panel. Also, each upper frame panel may be positioned in one of the upper frame openings so that the corresponding second insert and channel members form a second seal joint.

According to another aspect, the second seal joint may be capable of being in a locked or unlocked position.

According to one aspect, a method of attaching a hard top structure to a vehicle having a roll-bar cage may include overlaying a frame of the hard top structure to the roll-bar cage of the vehicle. The frame may include an upper frame member that defines one or more upper frame openings. Further, the upper frame member may have a channel member that extends around at least a portion of each upper frame opening. The method may also include positioning each of one or more upper frame panels in a corresponding upper frame opening. Each upper frame panel may have an insert member that extends around at least a portion of a perimeter of that panel. In addition, the method may include attaching each upper frame panel to the upper frame member so that the associated insert and channel members form a seal joint.

According to one aspect, a seal joint may include an insert member having a rounded portion and a channel member having a rounded portion opposing the rounded portion of the insert member. Further, the seal joint may include a sealant on the rounded portion of the insert or channel member so that the sealant is disposed between the insert and channel members to form the seal joint.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 12A-E illustrate perspective, top, outer side, inner side, and cross-sectional views of another embodiment of a frame panel in accordance with various aspects described herein.

FIGS. 17A-E illustrates perspective, top, outer side, inner side, and cross-sectional views of one embodiment of a frame panel in accordance with various aspects described herein.

DETAILED DESCRIPTION

Figure 1:
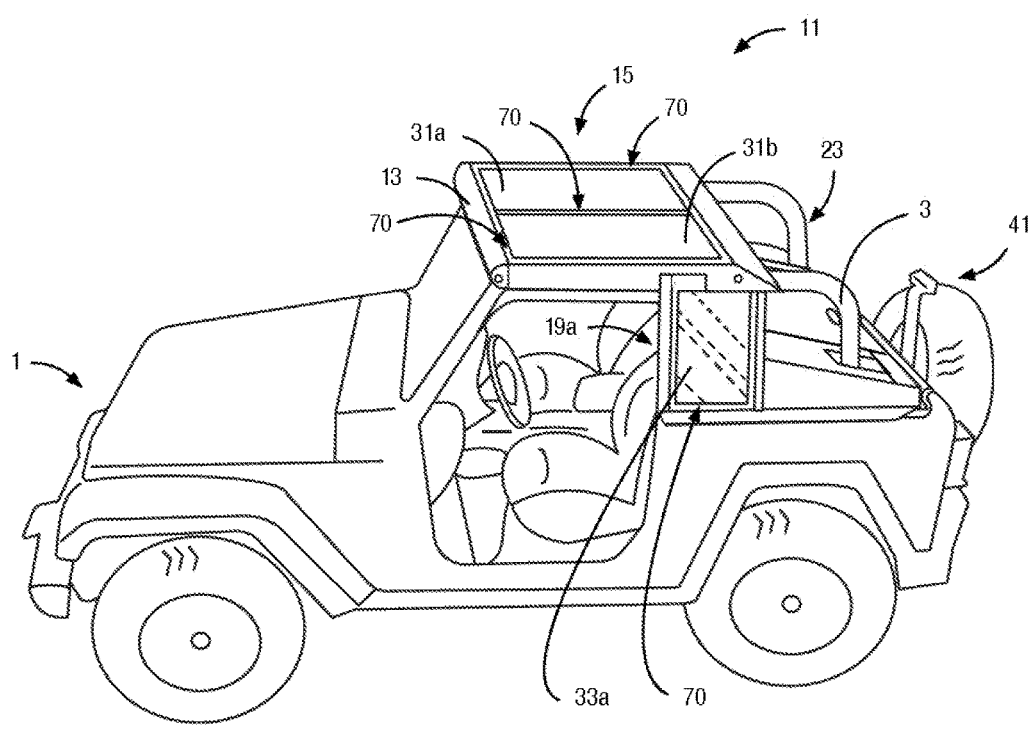
FIG. 1 illustrates an environmental perspective view of one embodiment of a hard top structure attached to a roll-bar cage of a two-door vehicle in accordance with various aspects as described herein.
Figure 2:
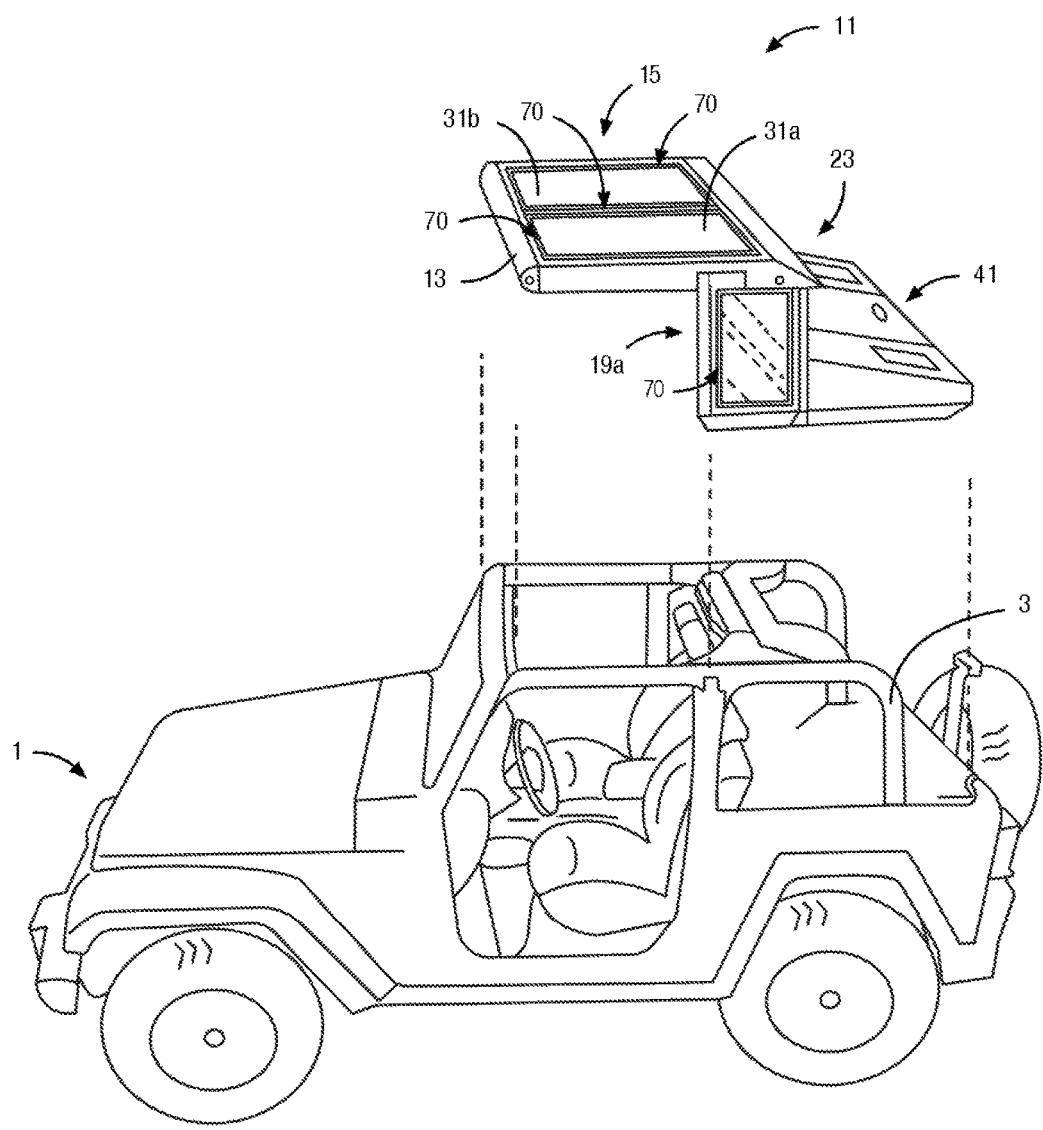
FIG. 2 illustrates a partially exploded view of the hard top structure attached to the roll-bar cage of FIG. 1 with upper, side and rear frame panels attached to the hard top structure.
Figure 3:
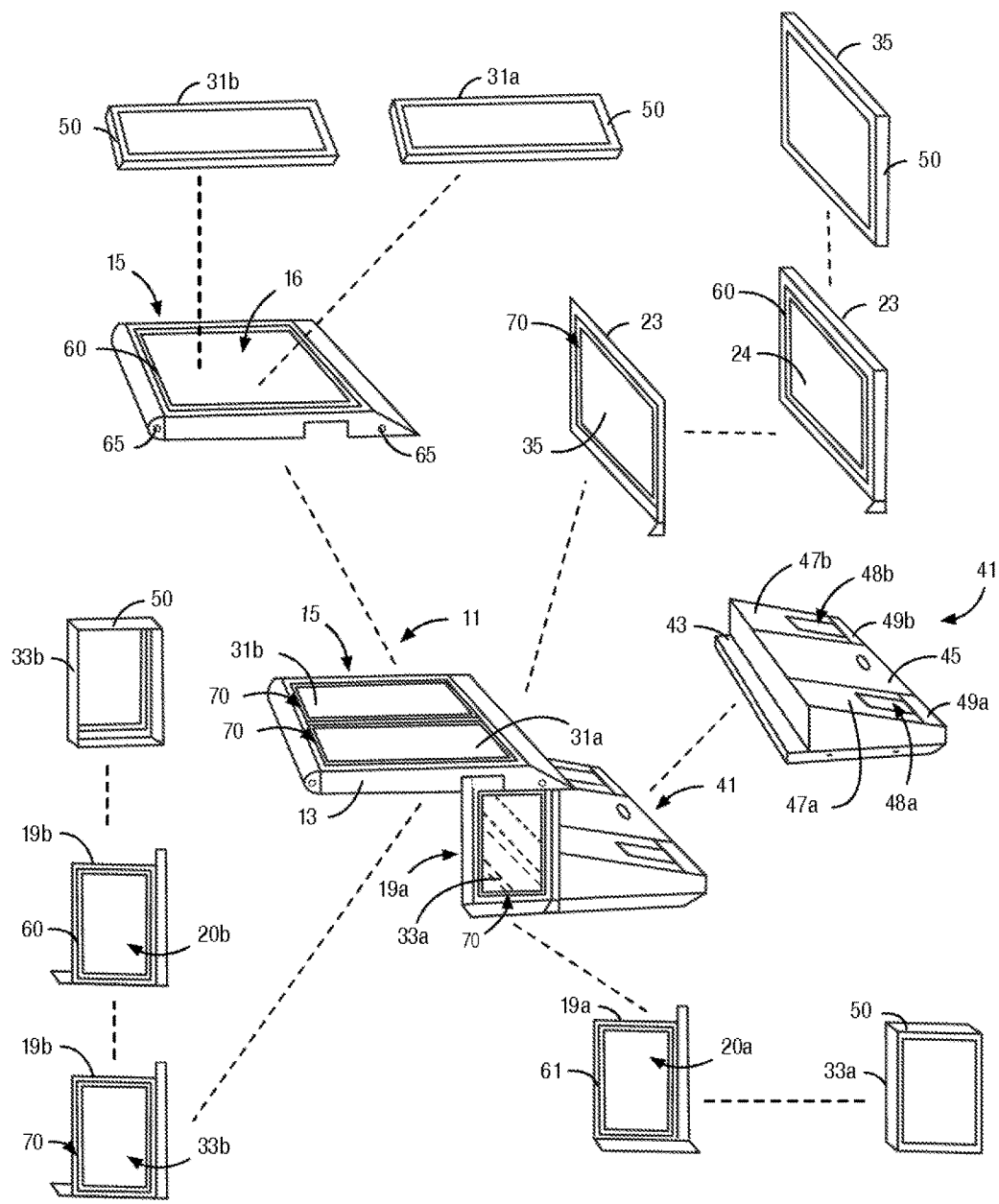
FIG. 3 illustrates a partially exploded view of the hard top structure of FIG. 1.
Figure 4A:
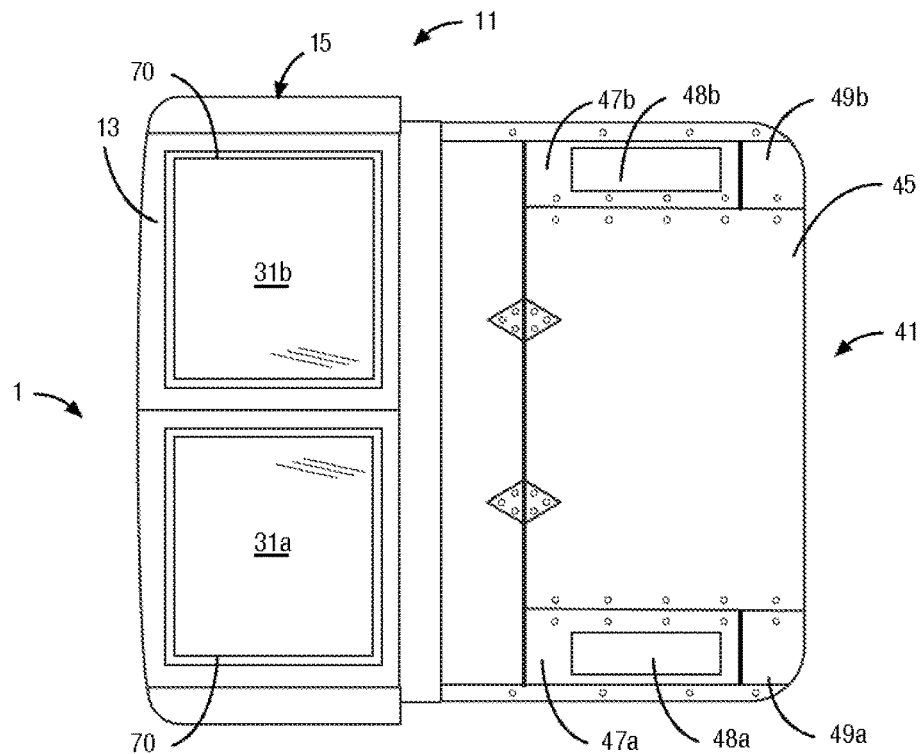
FIG. 4A-C illustrate top and side views of the hard top structure of FIG. 1.
Figure 4B:
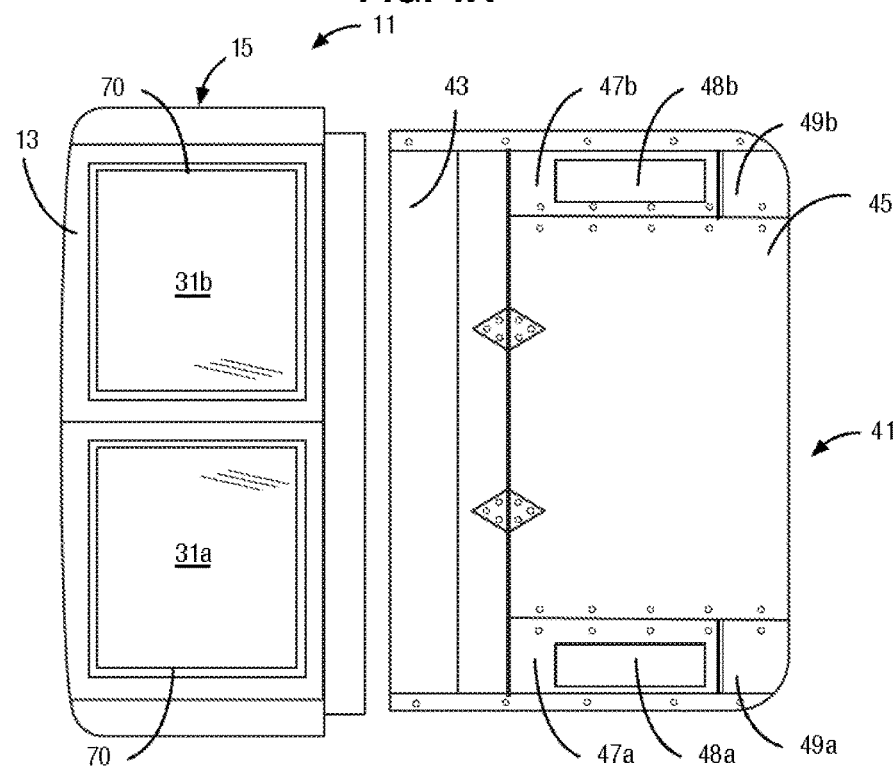
Figure 4C:
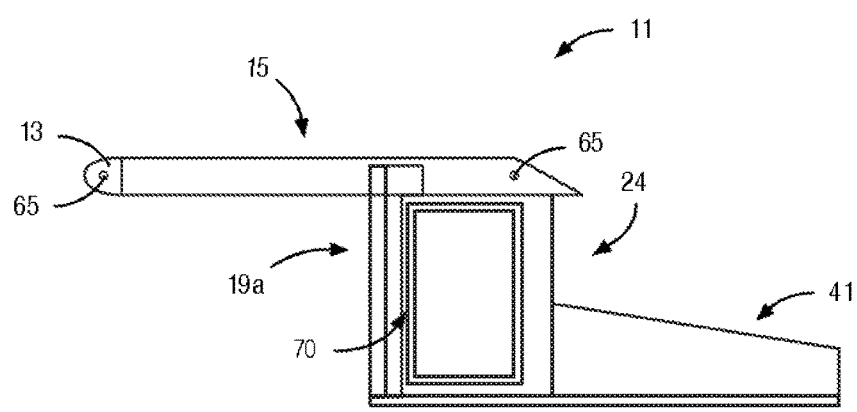
Figure 5:
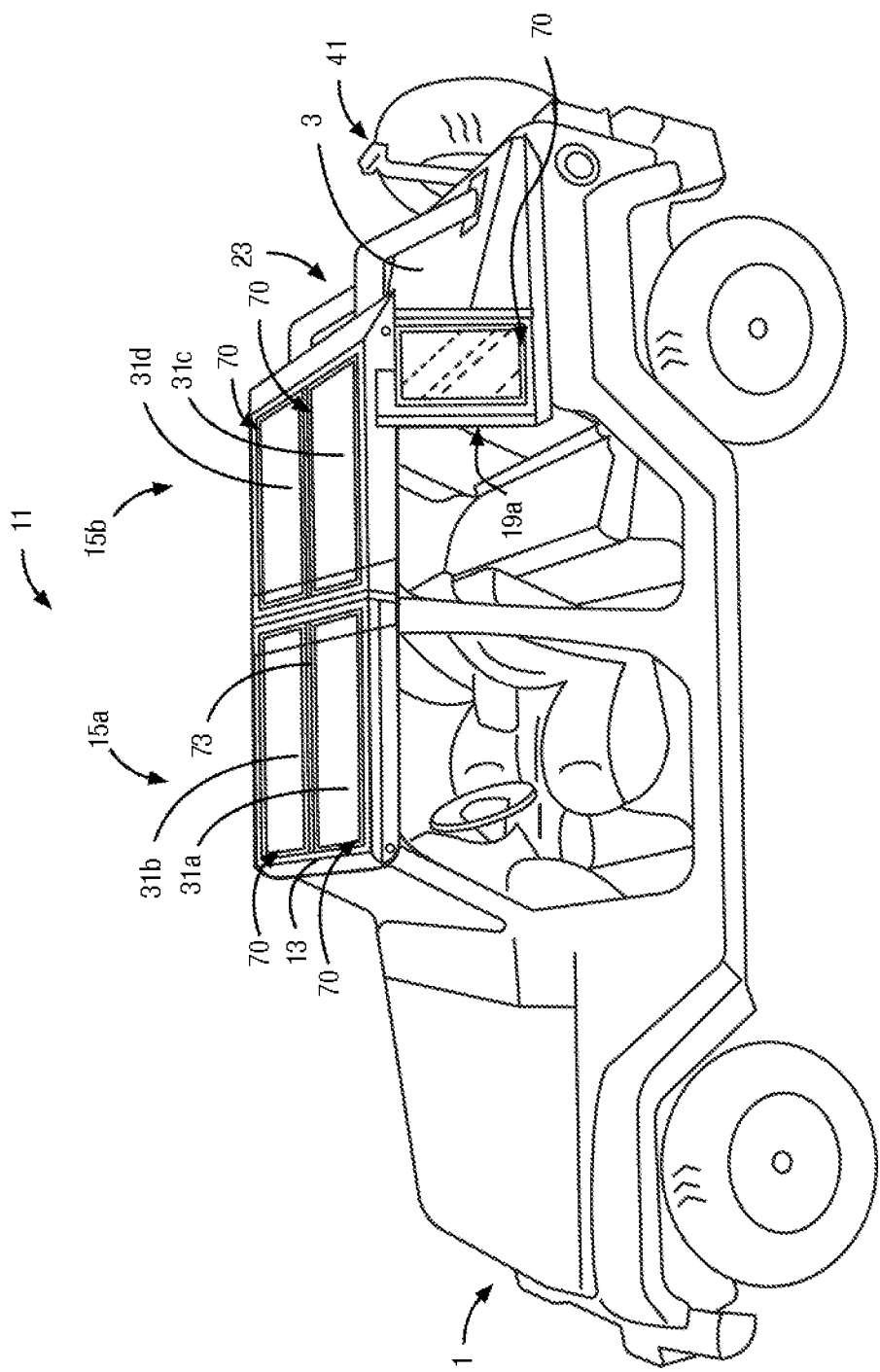
FIG. 5 illustrates an environmental perspective view of another embodiment of a hard top structure attached to a roll-bar cage of a four-door vehicle in accordance with various aspects as described herein.
Figure 6:
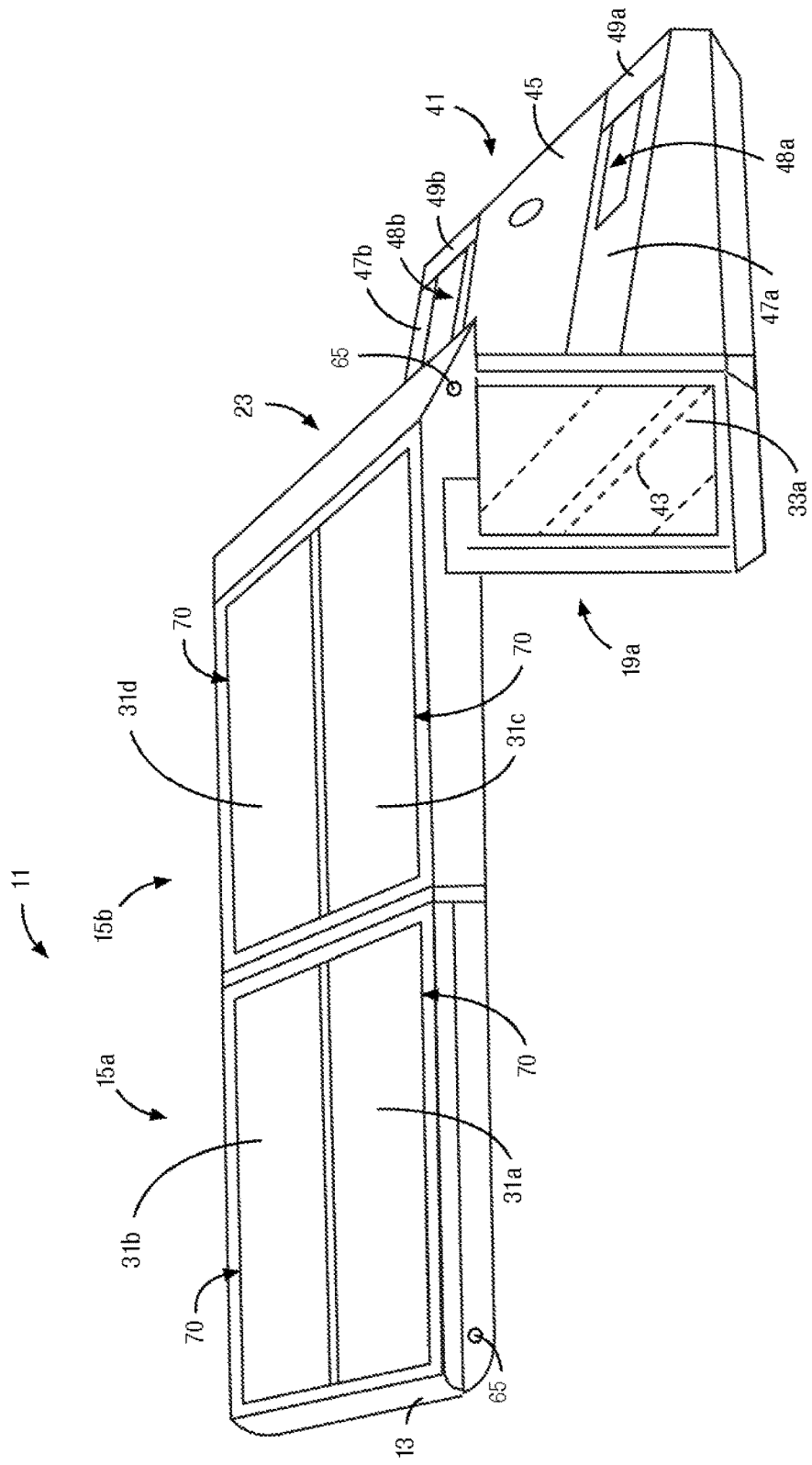
FIG. 6 illustrates a perspective view of the hard top structure of FIG. 5.
Figure 7:
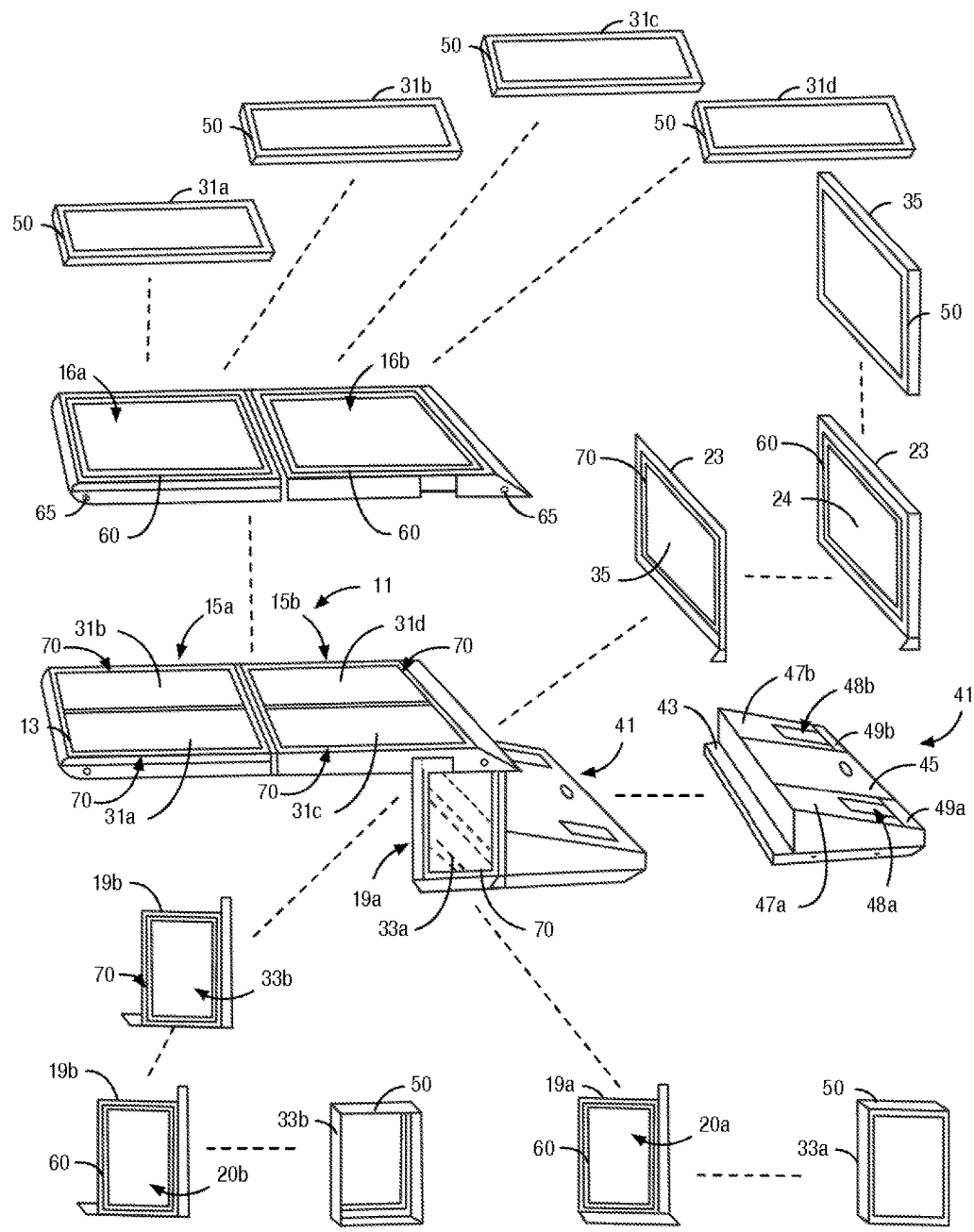
FIG. 7 illustrates an exploded view of the hard top structure of FIG. 5.
Figure 8A:
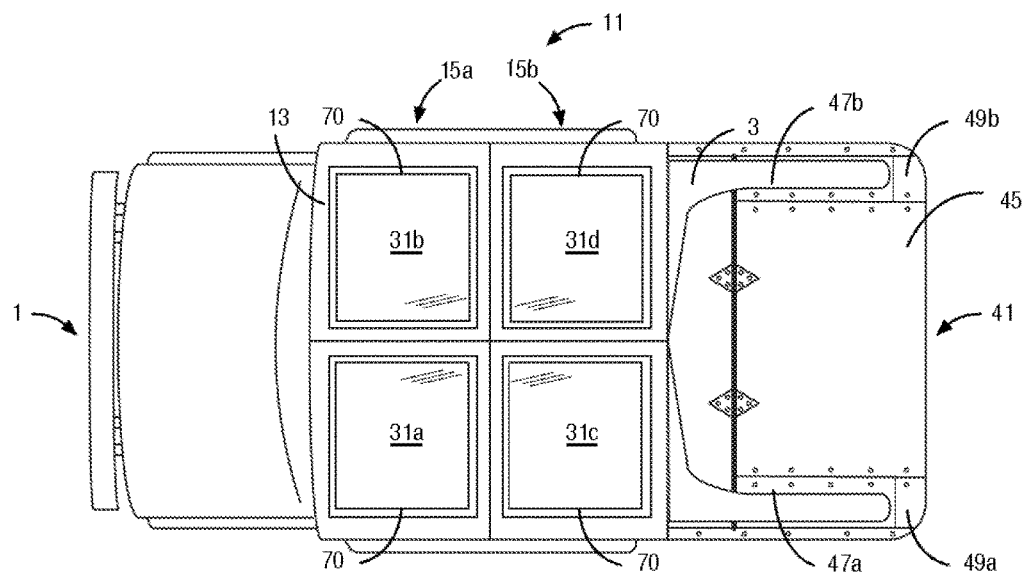
FIGS. 8A-C illustrate top and side views of the hard top structure of FIG. 5.
Figure 8B:
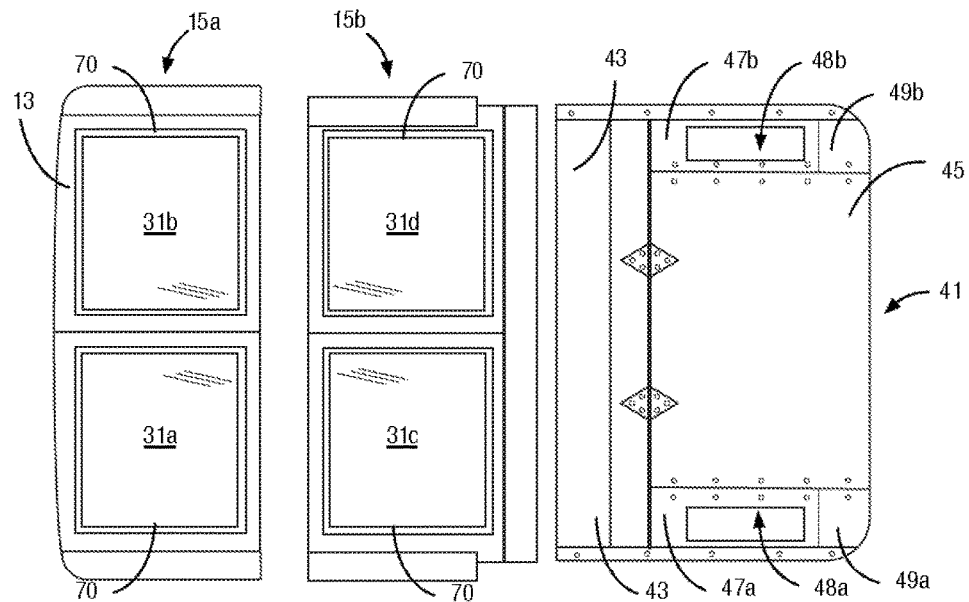
Figure 8C:
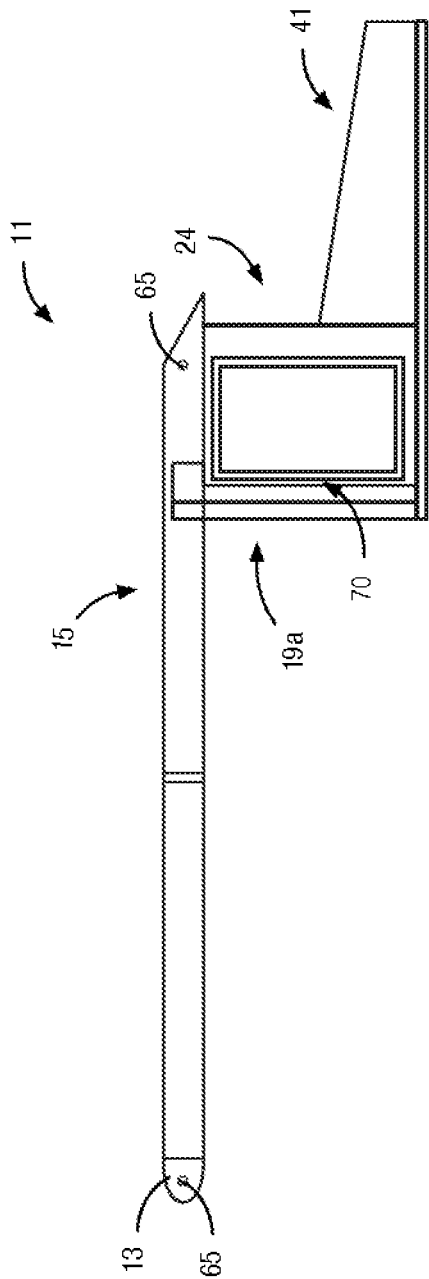
Figure 9A:
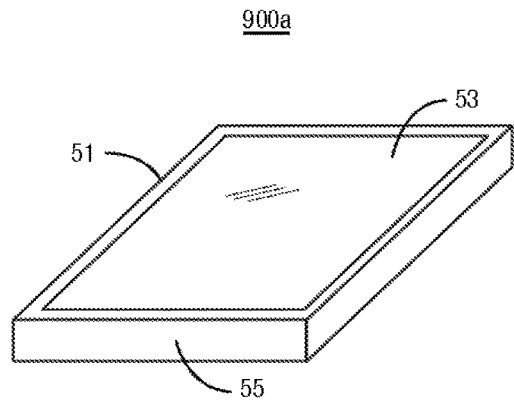
FIGS. 9A-E illustrates perspective, top, outer side, inner side, and cross-sectional views of one embodiment of a frame panel in accordance with various aspects described herein.
Figure 9B:
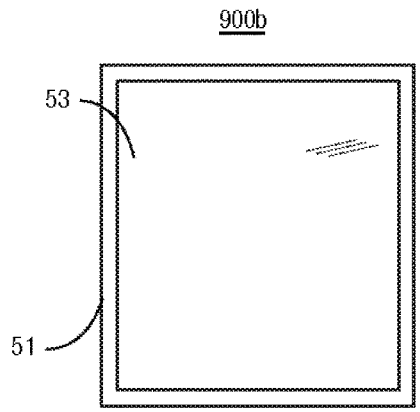
Figure 9C:
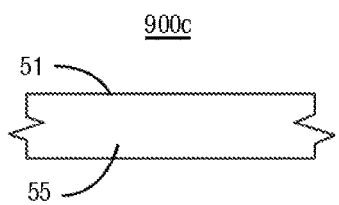
Figure 9D:
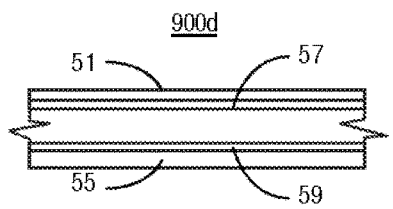
Figure 9E:
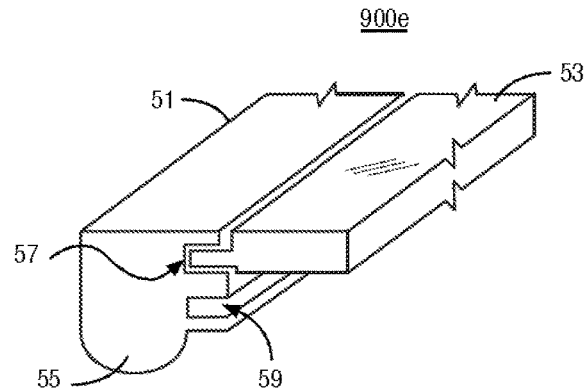

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

In this disclosure, a hard top structure for a vehicle having a roll-bar cage is provided. For example, FIGS. 1-4C illustrate one embodiment of a hard top structure 11 for a roll-bar cage 3 of a two-door vehicle 1 in accordance with various aspects as described herein. The two-door vehicle 1 may include side panels, a rear panel, and a windshield frame upon which is mounted the hard top structure 11. The hard top structure 11 may be securely attached to the vehicle 1 so as to function as an integral roll bar frame or cage. The hard top structure 11 may include a frame 13 that is adapted to overlay on and attach to the roll-bar cage 3 in a conventional manner such as by bolts or welds. The hard top structure 11 and any elements thereof may be composed of a composite material, metal, a material used for injection molding (e.g., metals, glasses, elastomers, confections, thermoplastic and thermosetting polymers), the like, or any combination thereof. The frame 13 may include an upper frame member 15 that is mounted to the windshield frame of the vehicle 1 in a conventional manner such as by bolts or welds. The vehicle 1 may include two side doors in the region of the driver and front passenger seats. The upper door frame of each door may be positioned to butt against the upper frame member 15.

Furthermore, the frame 13 may include side frame members 19*a,b* that extend downward from the upper frame member 15 to the side panels of the vehicle 1 at a point immediately behind front seats at front door openings of the vehicle 1. Each side frame member 19*a,b* may be firmly attached to the vehicle 1 in a conventional manner such as by bolts or welds. Also, the frame 13 may include a rear frame member 23 that extends between the rear corners of the upper frame member 15 and respective rear corners formed by the side panels and behind the front seats of the vehicle 1. Further, the rear frame member 23 may be firmly secured to the vehicle 1 in a conventional manner such as by bolts or welds. The upper frame member 15 may include one or more upper frame openings 16. Further, each side frame member 19*a,b* may include respective side frame opening 20*a,b*. Also, the rear frame member 23 may include a rear frame opening 24. Each frame member 15, 19*a-b*, 23 may include a channel member 60 that extends around at least a portion of each respective frame opening 16, 20*a,b*, 24. The structure of the channel member 60 may be as described herein by one or more of FIGS. 10, 13, 18, and 20.

The hard top structure 11 may also include upper panels 31*a,b*, side panels 33*a,b*, a rear panel 35, the like, or any combination thereof. Each panel 31*a,b*, 33*a,b*, 35 may correspond to a respective frame opening 16, 20*a,b*, 24. Each panel 31*a,b*, 33*a,b*, 35 may have a height of no more than one inch (1"), allowing for storage of any or all of the panels 31*a,b*, 33*a,b*, 35 in the trunk or on a shelf 43 of the vehicle. When all of the panels 31*a,b*, 33*a,b*, 35 are stacked, the combined height of the five (5) stacked panels 31*a,b*, 33*a,b*, 35 is no more than five inches (5"). When only the upper panels 31*a,b* are stacked, the combined height of the two (2) panels 31*a,b* is no more than two inches (2").

Each frame panel 31*a,b*, 33*a,b*, 35 may have an insert member 50 that extends around at least a portion of a perimeter of that panel 31*a,b*, 33*a,b*, 35. The structure of the insert member 50 may be as described herein by one or more of FIGS. 9A-E, 12A-E, 17A-E, and 20. Each frame panel 31*a,b*, 33*a,b*, 35 may be positioned in a respective frame opening 16, 20*a,b*, 24 so that the corresponding insert and channel members 50, 60 form a seal joint 70 such as a compression seal joint. The structure of the seal joint 70 may be as described herein by one or more of FIGS. 11, 14A-B, 19, and 20. For instance, each channel member 60 may include a shaped portion that is adapted to attach to a corresponding shaped portion of the insert member 50. In one example, the shaped portions of the channel and insert members 60, 50 may be rounded such as in a shape of a portion of a circle or oval. In another example, the shaped portions of the channel and insert members 60, 50 may be angled such as in a shape of a portion of a triangle, square, rectangle, or the like. In yet another example, the shaped portions of the channel and insert members 60, 50 may have multiple sides such as in a shape of a portion of a polygon. Each frame member 15, 19*a,b*, 23 may include one or more fasteners for attaching each respective frame panel 31*a,b*, 33*a,b*, 35 positioned in the corresponding frame opening 16, 20*a,b*, 24 to that frame member 15, 19*a,b*, 23 to form the seal joint 70. In one example, a fastener may be a latch that, when in a first configuration, is adapted to attach the channel and insert members to form the seal joint, and that, when in a second configuration, is adapted to allow the channel and insert members to be detached. In another example, a fastener may be a bolt, weld, or the like. A person of ordinary skill in the art will readily recognize various types of fasteners for attaching the channel and insert members 60, 50 to form the seal joint 70.

Moreover, the channel and insert members 60, 50 when attached to form the seal joint 70 may include a channel aperture above that seal joint 70. The channel aperture may enable a flow of fluid along at least a portion of the perimeter of the frame panel 31*a,b*, 33*a,b*, 35 so that the fluid is disposed from the channel aperture such as by one or more outlet ports 65 under the force of gravity, acceleration, wind, the like, or any combination thereof. The one or more outlet ports 65 may be disposed through a side of each frame member 15, 19*a,b*, 23 to the channel aperture. For instance, the one or more outlet ports 65 may be disposed through a side of the upper frame member 15 to the channel aperture.

In FIGS. 1-4C, the hard top structure 11 may further include a trunk structure 41. The trunk structure 41 may include a cargo shelf 43, a cargo lid 45, upper roll-bar panels 47*a-b*, lower roll-bar panels 49*a,b*, the like, or any combination thereof. The trunk structure 41 may be positioned to extend from the side and rear frame members 19*a,b*, 23 toward the rear panel of the vehicle 1. The trunk structure 41 may be securely attached to the side panels of the vehicle 1 in a conventional manner such as by bolts or welds. The cargo shelf 43 may be attached to the side and rear frame members 19*a,b*, 23 in a conventional manner such as by bolts or welds. The cargo shelf 43 may be sufficiently wide to allow for storage of one or more of the frame panels 31*a,b*, 33*a,b*, 35. Further, the cargo lid 45 may be attached to the cargo shelf 43 in a conventional manner such as by a hinge to allow the lid 45 to be radially rotated about the hinge away from the rear panel of the vehicle 1. Also, the upper roll-bar panels 47*a,b* may be attached to the cargo shelf 43 in a conventional manner such as by bolts or welds. Roll-bar openings 48*a,b* at a bottom of each upper roll-bar panel 47*a,b* may be configured to allow a corresponding roll-bar 3 to be disposed in the opening 48*a,b*. Further, each lower roll-bar panel 49*a,b* may be positioned to butt against and attach to a corresponding upper roll-bar panel 47*a,b* in a conventional manner such as by bolts or welds.

FIGS. 5-8 illustrate another embodiment of a hard top structure 11 attached to a roll-bar cage 3 of a four-door vehicle 1 in accordance with various aspects as described herein. The four-door vehicle 1 may include side panels, a rear panel, and a windshield frame upon which is mounted the hard top structure 11. The hard top structure 11 may be securely attached to the vehicle 1 so as to function as an integral roll bar frame or cage. The hard top structure 11 and any elements thereof may be composed of a composite material, metal, a material used for injection molding (e.g., metals, glasses, elastomers, confections, thermoplastic and thermosetting polymers), the like, or any combination thereof. Further, the hard top structure 11 may include a frame 13 that is adapted to overlay on and attach to the roll-bar cage 3 in a conventional manner such as by bolts or welds. The frame 13 may include upper frame members 15*a,b*. The front upper frame member 15*a* may be mounted to the windshield frame of the vehicle 1 in a conventional manner such as by bolts or welds. Further, the rear upper frame member 15*b* may be mounted to the roll-bar 3 of the vehicle 1 in a conventional manner such as by bolts or welds. Also, the front and rear upper frame members 15*a,b* may be attached in a conventional manner such as by bolts or welds. The vehicle 1 may include four side doors in the region of the driver and front passenger seats and the driver-side and passenger-side back seats. The upper door frame of each front door may be positioned to butt against the front upper frame member 15*a*. The upper door frame of each back door may be positioned to butt against the rear upper frame member 15*b*.

Furthermore, the frame 13 may include side frame members 19*a,b* that extend downward from the rear upper frame member 15*b* to the side panels of the vehicle 1 at a point immediately behind back seats at back door openings of the vehicle 1. Each side frame member 19*a,b* may be firmly attached to the vehicle 1 in a conventional manner such as by bolts or welds. Also, the frame 13 may include a rear frame member 23 that extends between the rear corners of the rear upper frame member 15*b* and respective rear corners formed by the side panels and behind the back seats of the vehicle 1. Further, the rear frame member 23 may be firmly secured to the vehicle 1 in a conventional manner such as by bolts or welds.

In FIGS. 5-8C, the hard top structure 11 may include upper panels 31*a-d*, side panels 33*a,b*, a rear panel 35, the like, or any combination thereof. The upper frame members 15*a,b* may include corresponding upper frame openings 16*a,b*. Further, each side frame member 19*a,b* may include a respective side frame opening 20*a,b*. Also, the rear frame member 23 may include a rear frame opening 24. Each frame member 15*a,b*, 19*a-b*, 23 may include the channel member 60 that extends around at least a portion of each respective frame opening 16*a,b*, 20*a,b*, 24. The structure of the channel member 60 may be as described herein by one or more of FIGS. 10, 13, 18A-E, and 20. Each panel 31*a-d*, 33*a,b*, 35 may correspond to the respective frame opening 16*a,b*, 20*a,b*, 24. Further, each panel 31*a-d*, 33*a,b*, 35 may have a height of no more than one inch (1"), allowing for storage of any or all of the panels 31*a-d*, 33*a,b*, 35 in the trunk of the vehicle. When all of the panels 31*a-d*, 33*a,b*, 35 are stacked, the combined height of the seven (7) stacked panels 31*a,b*, 33*a,b*, 35 is no more than seven inches (7"). When only the upper panels 31*a-d* are stacked, the combined height of the four (4) panels 31*a-d* is no more than four inches (4").

Each frame panel 31*a-d*, 33*a,b*, 35 may have the insert member 50 that extends around at least a portion of a perimeter of that panel 31*a-d*, 33*a,b*, 35. The structure of the insert member 50 may be as described herein by one or more of FIGS. 9A-E, 12A-E, 17A-E, and 20. Each frame panel 31*a-d*, 33*a,b*, 35 may be positioned in the respective frame opening 16*a,b*, 20*a,b*, 24 so that the corresponding insert and channel members 50, 60 form a seal joint 70 such as a compression seal joint. The structure of the seal joint 70 may be as described herein by one or more of FIGS. 11, 14A-B, 19, and 20. Each frame member 15*a,b*, 19*a,b*, 23 may include one or more fasteners for attaching each respective frame panel 31*a-d*, 33*a,b*, 35 positioned in the corresponding frame opening 16*a,b*, 20*a,b*, 24 to the that frame member 15*a,b*, 19*a,b*, 23 to form the seal joint 70. In one example, a fastener may be a latch that, when in a first configuration, is adapted to attach the channel and insert members 60, 50 to form the seal joint 70, and that, when in a second configuration, is adapted to allow the channel and insert members 60, 50 to be detached. In another example, a fastener may be a bolt, weld, or the like.

Furthermore, the channel and insert members 60, 50 when attached to form the seal joint 70 may include a channel aperture above that seal joint 70. The channel aperture may enable a flow of fluid along at least a portion of the perimeter of the frame panel 31*a-d*, 33*a,b*, 35 so that the fluid is disposed from the channel aperture such as by one or more outlet ports 65 under the force of gravity, acceleration, wind, the like, or any combination thereof. The one or more outlet ports 65 may be disposed through a side of each frame member 15*a,b*, 19*a,b*, 23 to the channel aperture. For instance, the outlet port 65 may be disposed through a side of the upper frame member 15*a,b* to the channel aperture. The cargo shelf 43 may be sufficiently wide to allow for storage of one or more of the frame panels 31*a-d*, 33*a,b*, 35.

FIGS. 9A-E illustrate perspective, top, outer side, inner side, and cross-sectional views of one embodiment of a frame panel 900*a-e* in accordance with various aspects described herein. The panel 900*a-e* may represent the structure of one or more of the panels 31*a-d*, 33*a,b*, 35 of FIGS. 1-8C and 15-16. The panel 900*a-e* may include an insert member 51, a top cover 53, the like, or any combination thereof. The insert member 51 may represent the structure of the insert member 50 for one or more sides of a panel or frame opening of FIGS. 1-8C and 15-16. The panel 900*a-e* and any elements thereof may be composed of a composite material, metal, a material used for injection molding (e.g., metals, glasses, elastomers, confections, thermoplastic and thermosetting polymers), the like, or any combination thereof. In one example, the insert member 51 may be composed of thermoplastic or thermosetting polymers. The insert member 51 may include a shaped portion 55, a first groove 57, a second groove 59, the like, or any combination thereof. The insert member 51 may extend around at least a portion of the perimeter of the panel 900*a-e*. The shaped portion 55 may be convex and positioned at or near the bottom (i.e., towards the vehicle) or an outer side of the insert member 51 and may be adapted to attach to a corresponding shaped portion of a channel member. In one example, the shaped portion 55 of the insert member 51 may be rounded such as in a shape of a portion of a circle or oval. In another example, the shaped portion 55 may have multiple sides such as in a shape of a portion of a polygon. Further, the shaped portion 55 may include a sealant that extends around a perimeter of the shaped portion of the insert member 55 so that the sealant is disposed between the channel and insert members when joined to form a seal joint (e.g., the seal joint 70 of FIGS. 1-8C and 15-16). A first groove 57 may be disposed in the insert member 51 and may extend around at least a portion of the perimeter of the panel 900*a-e*. Further, the first groove 57 may be configured to attach the top cover 53 (e.g., sunroof) such as a rigid transparent acrylic, glass or plastic material or a metal. The second groove 59 may extend around at least a portion of the inner perimeter of the insert member 51. Further, the second groove may be configured to attach a bottom cover such as a rigid opaque material. The shaped portion 55 may be adapted to fit in and attach to a corresponding shaped portion of a channel member.

Figure 10:
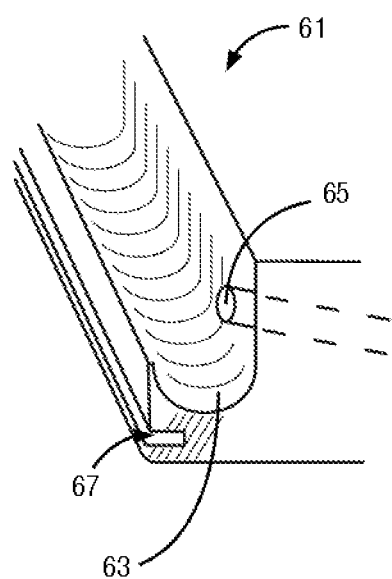
FIG. 10 illustrates a cross-sectional view of one embodiment of a portion of a frame having a channel member in accordance with various aspects described herein.

FIG. 10 illustrates a cross-sectional view of one embodiment of a channel member 61 in accordance with various aspects described herein. The channel member 61 may be associated with one or more of the frame members 15a-b, 19a-b, 23 or one or more of the panels 31a-d, 33a,b, 35 of FIGS. 1-8C and 15-16. Further, the channel member 61 may represent the structure of the channel member 60 for one or more sides of a panel or frame opening of FIGS. 1-8C and 15-16. The channel structure 61 and any elements thereof may be composed of a composite material, metal, a material used for injection molding (e.g., metals, glasses, elastomers, confections, thermoplastic and thermosetting polymers), the like, or any combination thereof. In FIG. 10, the channel member 61 may include a shaped portion 63, an outlet port 65, a groove 67, the like, or any combination thereof. The channel member 61 may extend around each frame opening. The shaped portion 63 may be concave and open towards the top (i.e., away from the vehicle) of the channel member 61 and may be adapted to attach to the corresponding shaped portion 55 of the insert member 51. In one example, the shaped portion 63 of the channel member 61 may be rounded such as in a shape of a portion of a circle or oval. In another example, the shaped portion 63 may have multiple sides such as in a shape of a portion of a polygon. Further, the channel member 61 may extend around at least a portion of each frame opening (e.g., the frame opening 16a,b, 20a,b, 24 of FIGS. 1-8C and 15-16). The channel member 61 may include a groove 67 that extends around at least a portion of the perimeter of the channel member 61. Further, the groove 67 may be configured to attach a bottom cover such as a shade or sun screen.

Figure 11:
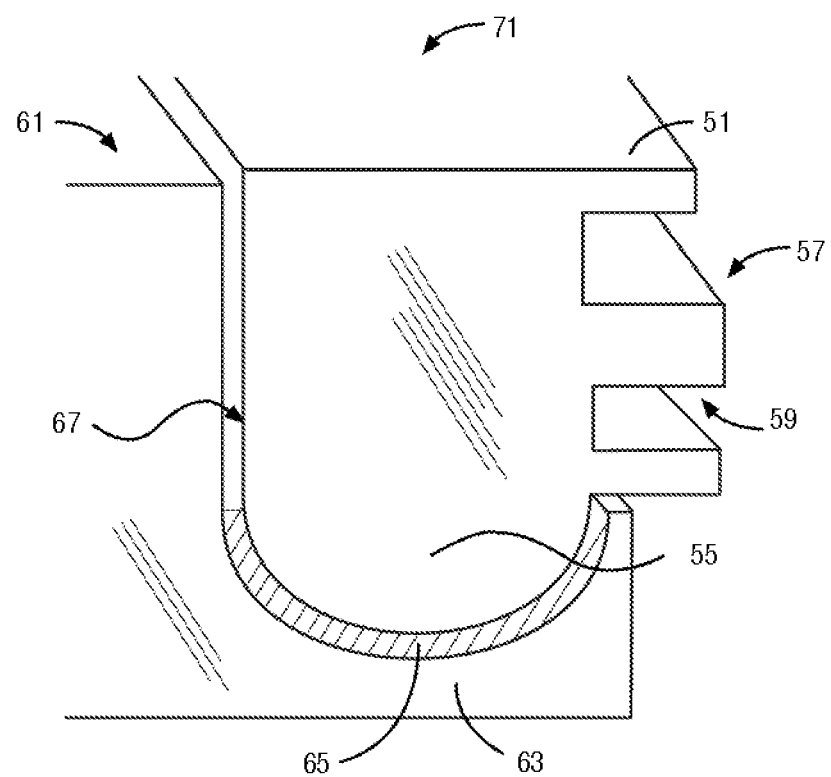
FIG. 11 illustrates a cross-sectional view of one embodiment of a portion of a seal joint in accordance with various aspects described herein.
Figure 12E:
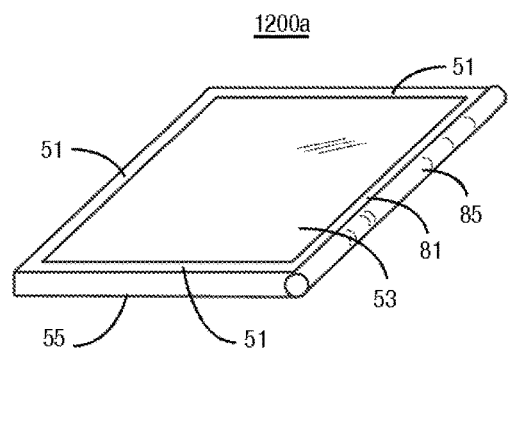
Figure 12E:
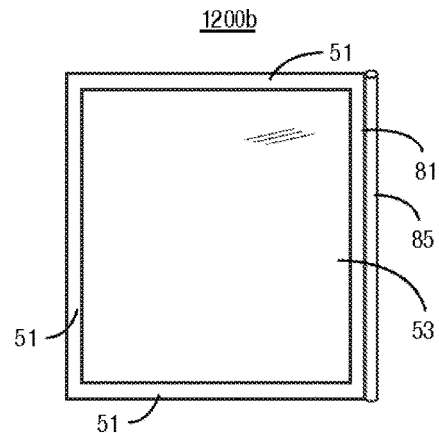
Figure 12E:
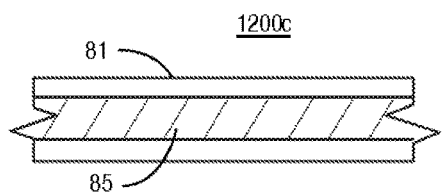
Figure 12E:
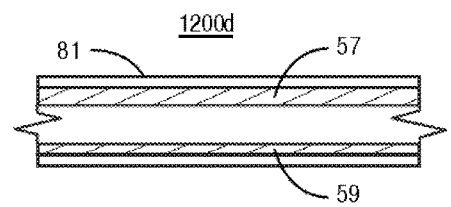
Figure 12E:
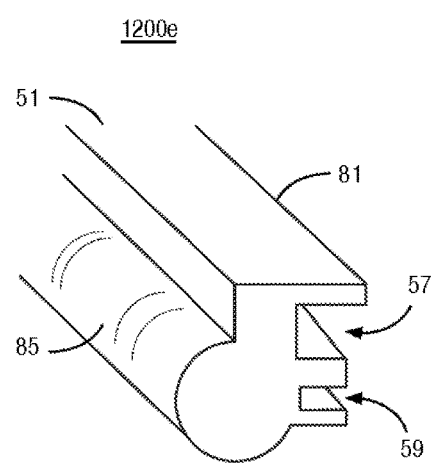

FIG. 11 illustrates a cross-sectional view of one embodiment of a portion of a seal joint 71 in accordance with various aspects described herein. The seal joint 71 may represent the structure of the seal joint 70 for one or more sides of a panel or frame opening of FIGS. 1-8C and 15-16. As previously discussed, each frame panel 31a-d, 33a,b, 35 may be positioned in a respective frame opening 16a,b, 20a,b, 24 so that the corresponding insert and channel members 51, 61 form a seal joint 71 such as a compression seal joint. Each channel member 61 may include the shaped portion 63 that is adapted to attach to the corresponding shaped portion 55 of the insert member 51. Further, at least one of the shaped portion 55 of the insert member 51 and the shaped portion 63 of the channel member 61 may include a sealant that extends around a perimeter of that shaped portion so that the sealant is disposed between the insert and channel members 51, 61 when joined to form the seal joint 71. In one example, the sealant is disposed on the surface of the shaped portion 63 of the channel member 61. In another example, the sealant is disposed on the surface of the shaped portion 55 of the insert member 51. The sealant may be any substance used to block the passage of a fluid through the seal joint 71.

Furthermore, the insert and channel members 51 and 61 when attached to form the seal joint 71 may include a channel aperture 67 above that seal joint. The channel aperture 67 may enable a flow of fluid along at least a portion of the perimeter of the corresponding frame panel 31a-d, 33a,b, 35 so that the fluid is disposed from the channel aperture 67 such as by one or more outlet ports (e.g., the outlet ports 65 of FIGS. 1-8C and 15-16) under the force of gravity, acceleration, wind, the like, or any combination thereof. Each outlet port 65 may be disposed through a side of the channel member 61 to the channel aperture. For instance, each outlet port 65 may be disposed through a side of the upper frame member 15a,b and the channel member 61 to a corresponding channel aperture.

FIGS. 12A-E illustrates perspective, top, outer side, inner side, and cross-sectional views of another embodiment of a frame panel 1200a-e in accordance with various aspects described herein. The panel 1200a-e may represent the structure of each of the panels 31a-d, 33a,b, 35 of FIGS. 1-8C and 15-16. The panel 1200a-e may include the insert member 51, a top cover 53, an insert member 81, the like, or any combination thereof. The insert member 51 may represent the structure of the insert member 50 for one or more sides of a panel or frame opening of FIGS. 1-8C and 15-16. Further, the insert member 81 may represent the structure of the insert member 50 for one or more sides of a panel or frame opening of FIGS. 1-8C and 15-16. The insert member 81 and any elements thereof may be composed of a composite material, metal, a material used for injection molding (e.g., metals, glasses, elastomers, confections, thermoplastic and thermosetting polymers), the like, or any combination thereof. In one example, the insert member 81 may be composed of thermoplastic and thermosetting polymers. The insert member 81 may include a shaped portion 85. The shaped portion 85 may be convex and positioned at the bottom, outside corner (i.e., towards the vehicle) of the insert member 81 and may be adapted to fit in and attach to a corresponding shaped portion of a channel member of the frame 13 or an adjacent panel. In one example, the shaped portion 85 of the insert member 81 may be rounded such as in a shape of a portion of a circle or oval. In another example, the shaped portion 85 may have multiple sides such as in a shape of a portion of a polygon. Further, the shaped portion 85 may include a sealant that extends around a perimeter of the shaped portion of the insert member 85 so that the sealant is disposed between the channel and insert members when joined to form a seal joint. The insert member 81 may extend around at least a portion of the perimeter of the panel 1200a-e. For instance, the first insert member 51 may extend around three sides of the panel 1200 a-e and the insert member 81 may extend around a fourth side of the panel 1200 a-e. Further, the fourth side of the panel 1200 a-e may adjoin a corresponding channel member of the frame 13 or an adjacent panel.

Figure 13:
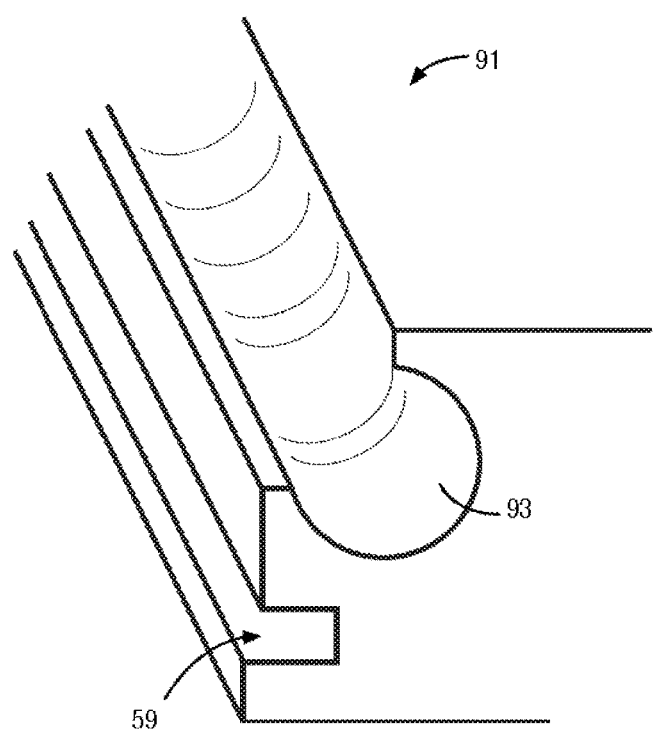
FIG. 13 illustrates a cross-sectional view of another embodiment of a portion of a channel member in accordance with various aspects described herein.

FIG. 13 illustrates a cross-sectional view of one embodiment of a portion of a channel member 91 in accordance with various aspects described herein. The channel member 91 may represent the structure of the channel member 60 for one or more sides of a panel or frame opening of FIGS. 1-8C and 15-16. In FIG. 13, the channel member 91 may include a shaped portion 93, the groove 67, the like, or any combination thereof. The shaped portion 93 of the channel member 91 may be concave and open towards the top (i.e., away from the vehicle) and may be adapted to attach to the corresponding shaped portion 85 of the insert member 81. In one example, the shaped portion 93 of the channel member 61 may be rounded such as in a shape of a portion of a circle or oval. In another example, the shaped portion 93 may have multiple sides such as in a shape of a portion of a polygon. The channel member 91 and any elements thereof may be composed of a composite material, metal, a material used for injection molding (e.g., metals, glasses, elastomers, confections, thermoplastic and thermosetting polymers), the like, or any combination thereof. The channel member 91 may extend around at least a portion of each frame opening 16a,b, 20a,b, 24. Further, the channel member 91 may extend around at least a portion of each panel 31a-d, 33a,b, 35. The groove 67 may extend around at least a portion of the perimeter of the channel member 91.

Figure 14A:
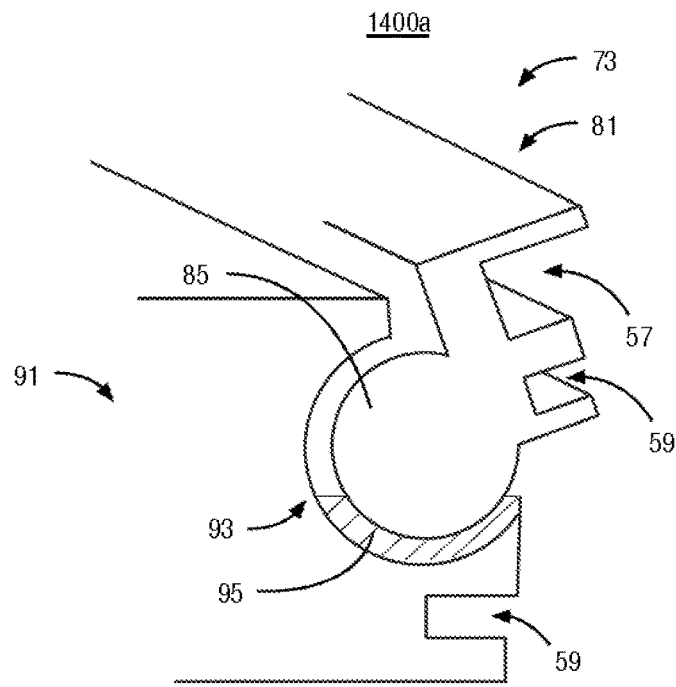
FIG. 14A-B illustrates a cross-sectional view of another embodiment of a portion of a seal joint in accordance with various aspects described herein.
Figure 14B:
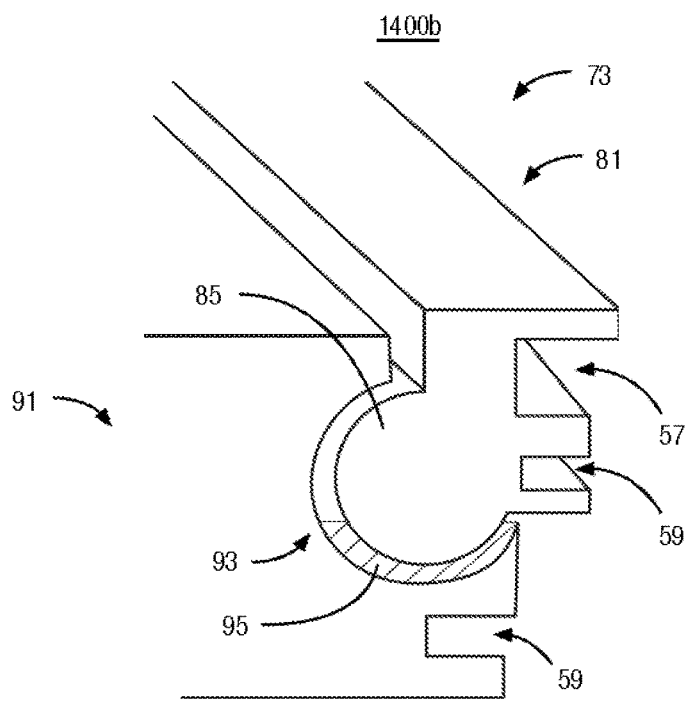

FIGS. 14A-B illustrate cross-sectional views of another embodiment of a portion of a seal joint 73 in unlocked and locked positions 1400a,b in accordance with various aspects described herein. While the insert member 81 is at a certain angle relative to the channel member 91, the shaped portion 85 of the insert member 81 may be disposed in the corresponding shaped portion 93 of the channel member 91, which corresponds to the unlocked position 1400a of FIG. 14A. In one example, the certain angle of the insert member 81 relative to the channel member 91 may be about forty-five degrees (45°). In another example, the certain angle of the insert member 81 relative to the channel member 91 may be about thirty-three degrees (33°). In yet another example, the certain angle of the insert member 81 relative to the channel member 91 may be in a range from about thirty-three degrees (33°) to about forty-five degrees (45°).

While the insert member 81 is in the unlocked position as show in FIG. 14A, the insert member 81 may be radially moved about the seal joint 73 to the locked position 1400b shown in FIG. 14B. Alternatively, the insert member 81 may be detached from the channel member 61 so that the insert member 81 is no longer disposed in the channel member 91. While the insert member 81 is in the locked position 1400b as show in FIG. 14B, the insert member 81 may be radially moved about the seal joint 73 to the unlocked position 1400a shown in FIG. 14A. The shaped portion 85 of the insert member 81 may be adapted to fit in and attach to the corresponding shaped portion 93 of the channel member 91. Further, at least one of the shaped portion 85 of the insert member 81 and the shaped portion 93 of the channel member 91 may include a sealant 95 that extends around a perimeter of that shaped portion so that the sealant 95 is disposed between the insert and channel members 81, 91 when joined to form the seal joint 73. In one example, the sealant 95 is disposed on the surface of the shaped portion 93 of the channel member 91. In another example, the sealant 95 is disposed on the surface of the shaped portion 85 of the insert member 81. The sealant 95 may be any substance used to block the passage of a fluid through the seal joint 73.

Figure 15:
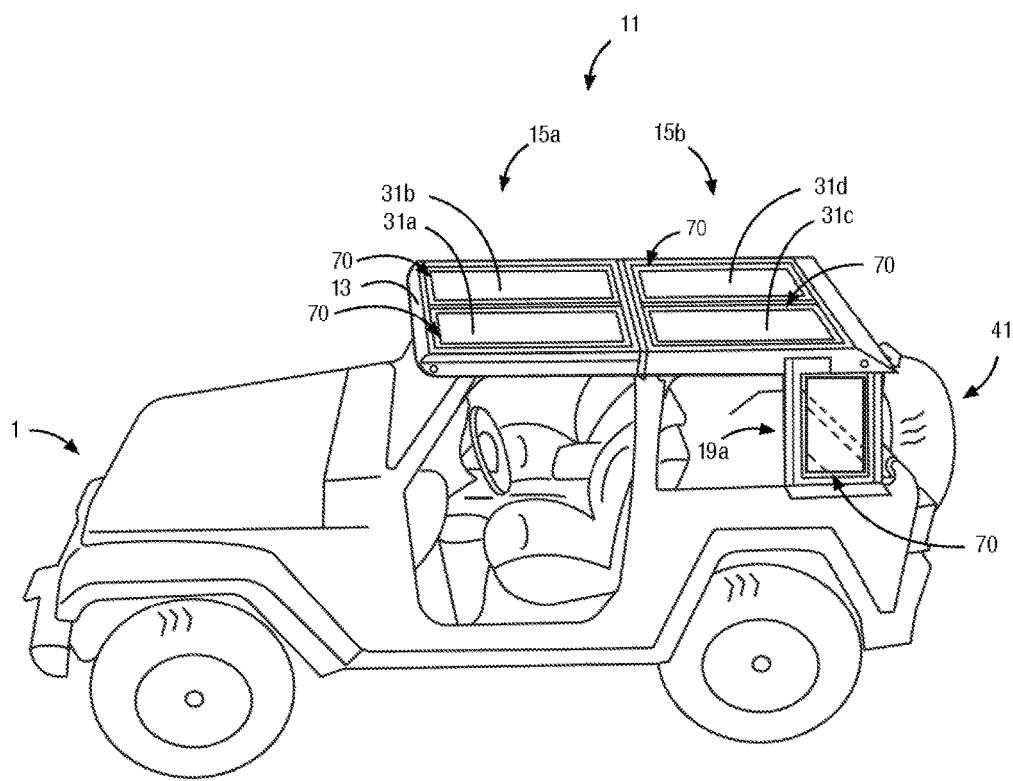
FIGS. 15-16 illustrate environmental perspective views of other embodiments of a hard top structure attached to a roll-bar cage of a two-door vehicle in accordance with various aspects as described herein.
Figure 16:
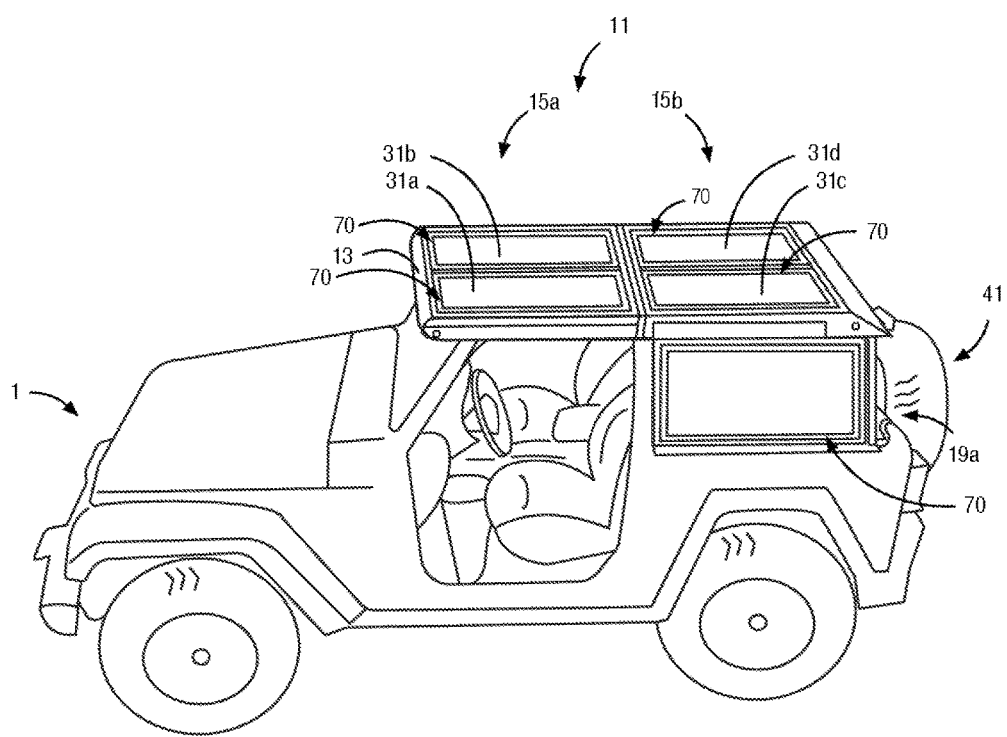
Figure 18A:
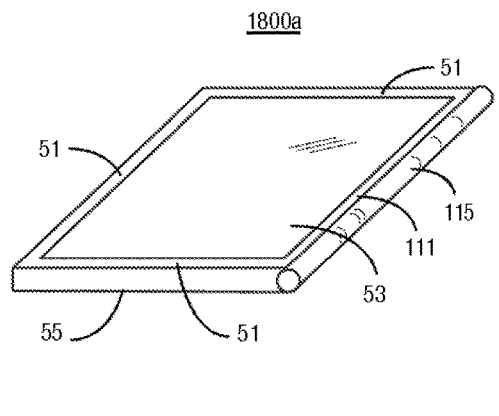
FIGS. 18A-E illustrates perspective, top, outer side, inner side, and cross-sectional views of one embodiment of a frame panel in accordance with various aspects described herein.
Figure 18B:
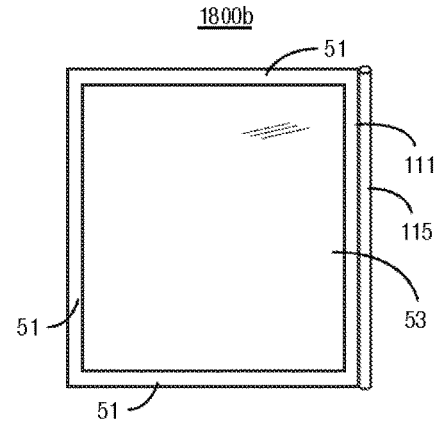
Figure 18C:
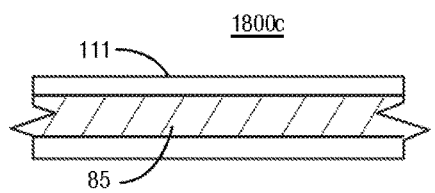
Figure 18D:
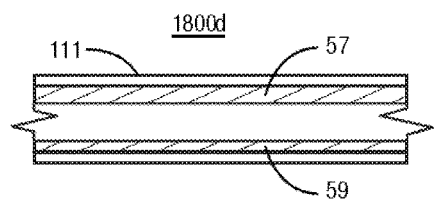
Figure 18E:
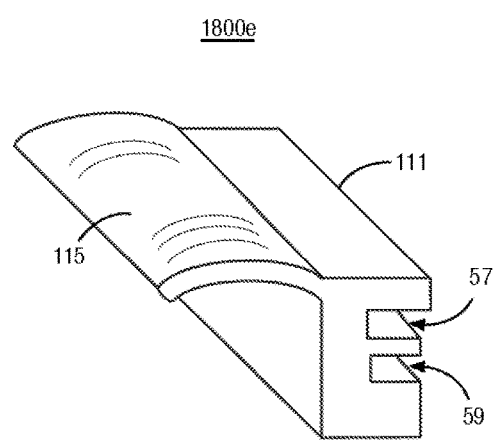

FIGS. 15-16 illustrate environmental perspective views of other embodiments of a hard top structure 11 attached to a roll-bar cage 3 of a two-door vehicle 1 in accordance with various aspects as described herein. The two-door vehicle 1 may include side panels, a rear panel, and a windshield frame upon which is mounted the hard top structure 11. The hard top structure 11 may be securely attached to the vehicle 1 so as to function as an integral roll bar frame or cage. The hard top structure 11 may include a frame 13 that is adapted to overlay on and attach to the roll-bar cage 3 in a conventional manner such as by bolts or welds. The frame 13 may include an upper frame member 15 that is mounted to the windshield frame of the vehicle 1 in a conventional manner such as by bolts or welds. The vehicle 1 may include two side doors in the region of the driver and front passenger seats. The upper door frame of each door may be positioned to butt against the upper frame member 15.

Furthermore, the frame 13 may include side frame members 19a,b that extend downward from the upper frame member 15 to the side panels of the vehicle 1 at a point immediately behind front seats at front door openings of the vehicle 1. Each side frame member 19a,b may be firmly attached to the vehicle 1 in a conventional manner such as by bolts or welds. Also, the frame 13 may include a rear frame member 23 that extends between the rear corners of the upper frame member 15 and respective rear corners formed by the side and rear panels of the vehicle 1.

FIGS. 17A-E illustrates perspective, top, outer side, inner side, and cross-sectional views of one embodiment of a frame panel 1700a-e in accordance with various aspects described herein. The panel 1700a-e may represent the structure of one or more of the panels 31a-d, 33a,b, 35 of FIGS. 1-8C and 15-16. The panel 1700a-e may include an insert member 51, a top cover 53, an insert member 101, the like, or any combination thereof. The insert member 101 may represent the structure of the insert member 50 for one or more sides of a panel or frame opening of FIGS. 1-8C and 15-16. In one example, the insert member 51 may be on three-sides of a panel or frame opening, and the insert member 101 may be on the fourth side of that panel or frame opening. The insert member 101 and any elements thereof may be composed of a composite material, metal, a material used for injection molding (e.g., metals, glasses, elastomers, confections, thermoplastic and thermosetting polymers), the like, or any combination thereof. In one example, the insert member 101 may be composed of thermoplastic or thermosetting polymers. The insert member 101 may include a shaped portion 105, a first groove 57, a second groove 59, the like, or any combination thereof. The shaped portion 105 may be convex and positioned at the top, outside corner (i.e., away from the vehicle) of the insert member 101 and may be adapted to fit in and attach to a corresponding shaped portion of a channel member of the frame 13 or an adjacent panel. In one example, the shaped portion 105 of the insert member 101 may be rounded such as in a shape of a portion of a circle or oval. In another example, the shaped portion 105 of the insert member 101 may have multiple sides such as in a shape of a portion of a polygon.

In FIGS. 17A-E, the insert member 101 may extend around at least a portion of the outer perimeter of the panel 1700a-e. A first groove 57 may be disposed in the insert member 101 and may extend around at least a portion of the inner perimeter of the panel 1700a-e. Further, the first groove 57 may be configured to attach the top cover 53 (e.g., sunroof) such as a rigid transparent acrylic, glass or plastic material or a metal. The second groove 59 may extend around at least a portion of the inner perimeter of the insert member 51. Further, the second groove may be configured to attach a bottom cover such as a rigid opaque material. The shaped portion 105 may be adapted to fit in and attach to a corresponding shaped portion of a channel member. Further, the shaped portion 105 may include a sealant that extends around a perimeter of the shaped portion of the insert member 101 so that the sealant is disposed between the channel and insert members when joined to form a seal joint (e.g., the seal joint 70 of FIGS. 1-8C and 15-16).

FIGS. 18A-E illustrates perspective, top, outer side, inner side, and cross-sectional views of one embodiment of a frame panel 1800a-e in accordance with various aspects described herein. The panel 1800a-e may represent the structure of one or more of the panels 31a-d, 33a,b, 35 of FIGS. 1-8C and 15-16. The panel 1800a-e may include an insert member 51, a top cover 53, a channel member 111, the like, or any combination thereof. Each frame panel 1800a-e and any elements thereof may be composed of a composite material, metal, a material used for injection molding (e.g., metals, glasses, elastomers, confections, thermoplastic and thermosetting polymers), the like, or any combination thereof. The channel member 111 may represent the structure of the channel member 60 for one or more sides of a panel or frame opening of FIGS. 1-8C and 15-16. In one example, the insert member 51 may be on three-sides of a panel or frame opening, and the channel member 111 may be on the fourth side of that panel or frame opening. The channel member 111 and any elements thereof may be composed of a composite material, metal, a material used for injection molding (e.g., metals, glasses, elastomers, confections, thermoplastic and thermosetting polymers), the like, or any combination thereof. In one example, the channel member 111 may be composed of thermoplastic or thermosetting polymers. The channel member 111 may include a shaped portion 115, a first groove 57, a second groove 59, the like, or any combination thereof. The shaped portion 115 of the channel member 111 may be concave and extend outward away from the panel 1800a-e and may be adapted to fit over and attach to the corresponding shaped portion 85 of the insert member 81. In one example, the shaped portion 115 of the channel member 111 may be rounded such as in a shape of a portion of a circle or oval. In another example, the shaped portion 115 of the channel member 111 may have multiple sides such as in a shape of a portion of a polygon.

In FIGS. 18A-E, the channel member 111 may extend around at least a portion of the outer perimeter of the panel 1800a-e. A first groove 57 may be disposed in the channel member 111 and may extend around at least a portion of the inner perimeter of the panel 1800a-e. Further, the first groove 57 may be configured to attach the top cover 53 (e.g., sunroof) such as a rigid transparent acrylic, glass or plastic material or a metal. The second groove 59 may extend around at least a portion of the inner perimeter of the channel member 111. Further, the second groove 59 may be configured to attach a bottom cover such as a rigid opaque material. The shaped portion 115 of the channel member 111 may be adapted to fit over and attach to a corresponding shaped portion of an insert member. Further, the shaped portion 115 may include a sealant that extends around a perimeter of the shaped portion of the channel member 111 so that the sealant is disposed between the channel member 111 and an insert member when joined to form a seal joint (e.g., the seal joint 70 of FIGS. 1-8C and 15-16).

Figure 19:
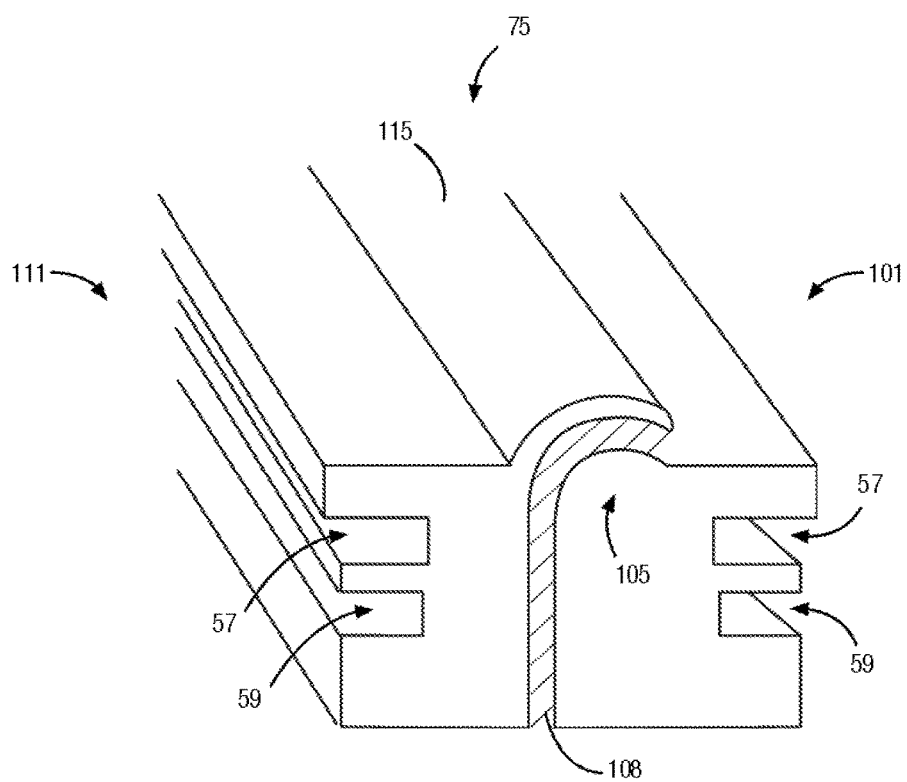
FIG. 19 illustrates a cross-sectional view of another embodiment of a portion of a seal joint in accordance with various aspects described herein.

FIG. 19 illustrates a cross-sectional view of another embodiment of a portion of a seal joint 75 in accordance with various aspects described herein. The seal joint 75 may represent the structure of the seal joint 70 for one or more sides of a panel or frame opening of FIGS. 1-8C and 15-16. Each frame panel 31a-d, 33a,b, 35 may be positioned in a respective frame opening 16a,b, 20a,b, 24 so that the corresponding insert and channel members 101, 111 form the seal joint 75 such as a compression seal joint. Each channel member 111 may include a shaped portion 115 that is adapted to fit over and attach to the corresponding shaped portion 105 of an insert member 101. Further, at least one of the shaped portion 105 of the insert member 101 and the shaped portion 115 of the channel member 111 may include a sealant 108 that extends around a perimeter of that shaped portion so that the sealant 108 is disposed between the insert and channel members 101, 111 when joined to form the seal joint 75. In one example, the sealant 108 is disposed on the surface of the shaped portion 115 of the channel member 111. In another example, the sealant is disposed on the surface of the shaped portion 105 of the insert member 101. The sealant may be any substance used to block the passage of a fluid through the seal joint 75.

Figure 20:
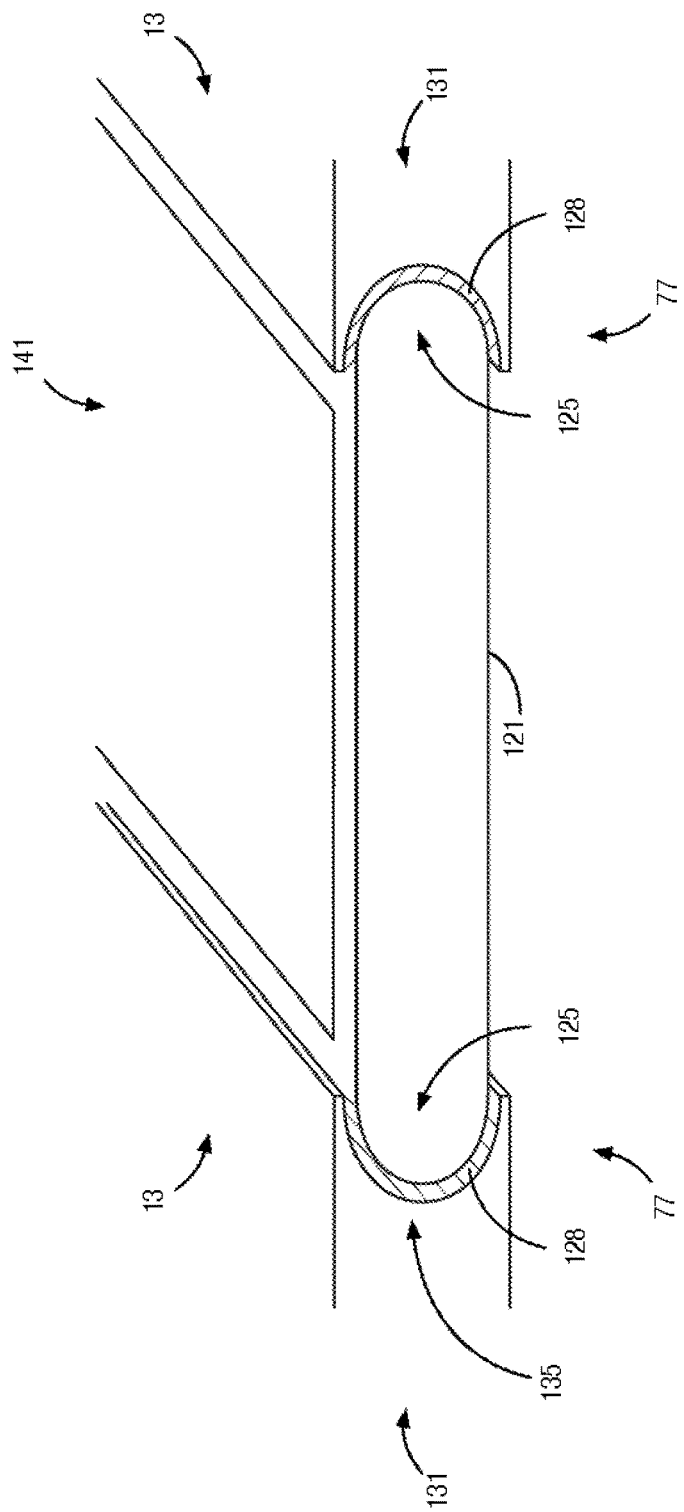
FIG. 20 illustrates a cross-sectional view of another embodiment of a portion of a seal joint in accordance with various aspects described herein.

FIG. 20 illustrates a cross-sectional view of another embodiment of a portion of a seal joint 77 in accordance with various aspects described herein. The seal joint 77 may represent the structure of the seal joint 70 for one or more sides of a panel or frame opening of FIGS. 1-8C and 15-16. Each frame panel 31a-d, 33a,b, 35 may be positioned in a respective frame opening 16a,b, 20a,b, 24 so that corresponding insert and channel members 121, 131 form the seal joint 77 such as a compression seal joint. Each frame panel 31a-d, 33a,b, 35 and any elements thereof may be composed of a composite material, metal, a material used for injection molding (e.g., metals, glasses, elastomers, confections, thermoplastic and thermosetting polymers), the like, or any combination thereof. Each channel member 131 may include a concave shaped portion 135 that is adapted to attach to a corresponding convex shaped portion 125 of the insert member 121. Further, at least one of the shaped portion 125 of the insert member 121 and the shaped portion 135 of the channel member 131 may include a sealant 128 that extends around a perimeter of that shaped portion so that the sealant 128 is disposed between the insert and channel members 121, 131 when joined to form the seal joint 77. In one example, the sealant 128 is disposed on the surface of the shaped portion 135 of the channel member 131. In another example, the sealant is disposed on the surface of the shaped portion 125 of the insert member 121. The sealant may be any substance used to block the passage of a fluid through the seal joint 77.

As show in FIG. 20, the insert member 121 may be positioned on opposite sides of a panel 141. Further, the channel member 131 may be positioned on opposite sides of a frame opening of the frame 13. The panel 141 may be positioned so that the insert members 121 are disposed in the corresponding channel members 131 so that the panel 141 may be moved or slid into the opening. Once the panel 141 is positioned in the opening, the panel 141 may be attached in a conventional manner such as by a bolt, latch, weld, or the like.

In another embodiment, each panel 31a, c may include the insert member 51 on three sides of that panel and the channel member 111 on a fourth side of that panel. Further, each panel 31b,d may include the insert members 51 on three sides of that panel and the insert member 101 on a fourth side of that panel. Also, the fourth side of each of the panels 31a,c may be adjacent to the fourth side of the corresponding panel 31b,d so that the insert and channel members 101, 111 form the joint seal 75.

In another embodiment, each panel 31a,c may include the insert member 51 on three sides of that panel and the channel member 91 on a fourth side of that panel. Further, each panel 31b,d may include the insert member 51 on three sides of that panel and the insert member 101 on a fourth side of that panel. Also, the fourth side of each of the panels 31a,c may be adjacent to the fourth side of the corresponding panel 31b,d so that the insert and channel members 81, 91 form the joint seal 73.

In another embodiment, each panel 31a,c may include the insert member 51 on two opposing sides of that panel and the channel members 91, 111 on the other two opposing sides of that panel. Further, each panel 31b,d may include the insert member 51 on two opposing sides of that panel and the insert members 81, 101 on the other two opposing sides of that panel.

In another embodiment each panel 33a,b, 35 may include the insert member 121 on two opposing sides of that panel. Further, two opposing sides of the corresponding frame opening may include the channel members 131.

In another embodiment, any of the seal joints 71, 73, 75, 77 of FIGS. 9-14B, 17A-20 may be used for any side of a panel or opening of a frame.

In one embodiment, one or more of the seal joints 71, 73, 75, 77 of FIGS. 9-14B, 17A-20 may be used for an appliance (e.g., refrigerator, oven, microwave, dishwasher, washer, dryer, and the like), window, door, cabinet, furniture, or any structure having an opening or a panel. For instance, a door of an appliance may use one or more of the seal joints 71, 73, 75, 77.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A hard top structure adapted to attach to a vehicle having a roll-bar cage, comprising:
   a frame adapted to overlay on and attach to the roll-bar cage, the frame including an upper frame member that defines one or more upper frame openings, the upper frame member having a channel member that extends around at least a portion of each upper frame opening, each channel member having a shaped portion; and
   one or more upper frame panels with each corresponding to one of the upper frame openings, each upper frame panel having an insert member that extends around at least a portion of a perimeter of that panel, wherein each upper frame panel is positioned in one of the upper frame openings so that the corresponding insert and channel members form a seal joint, each insert member having a corresponding shaped portion that is adapted to attach to the corresponding shaped portion of the channel member, and each insert member also having a first groove that extends around at least a portion of an inner perimeter of that insert member with the first groove being configured to attach a top cover.

2. The structure of claim 1, wherein the channel or insert member includes a sealant that extends around a perimeter of the rounded portion of that member so that the sealant is disposed between the channel and insert members to form the seal joint.

3. The structure of claim 1, wherein the channel and insert members when attached to form the seal joint include a channel aperture above the seal joint, wherein the channel aperture allows a flow of fluid along at least the portion of the perimeter of the panel.

4. The structure of claim 3, wherein the upper frame member includes an outlet port adjacent the channel aperture so that any fluid in the channel aperture flows from the channel aperture into the outlet port.

5. The structure of claim 4, wherein the upper frame member is angled so that any fluid in the channel aperture flows from the channel aperture into the outlet port under the force of gravity.

6. The structure of claim 1, wherein the seal joint is a compression seal joint.

7. The structure of claim 1, wherein the upper frame member includes one or more fasteners for attaching the one or more panels to the frame member.

8. The structure of claim 1, wherein a maximum height of each upper frame panel is no more than one inch.

9. The structure of claim 1, wherein the frame further includes:
   a rear frame member that defines one or more rear frame openings, the rear frame member having a channel member that extends around at least a portion of each rear frame opening; and
   a rear frame panel for each rear frame opening with each rear frame panel having an insert member that extends around at least a portion of a perimeter of that panel, wherein each rear frame panel is positioned in one of the rear frame openings so that the corresponding insert and channel members form a seal joint.

10. The structure of claim 9, wherein a maximum height of each rear frame panel is no more than one inch.

11. The structure of claim 10, wherein a combined maximum height of the upper and rear frame panels for a two-door vehicle is no more than three inches when stacked.

12. The structure of claim 10, wherein a combined maximum height of the upper and rear frame panels for a four-door vehicle is no more than five inches when stacked.

13. The structure of claim 9, wherein the frame further includes:
   one or more side frame members with each defining one or more side frame openings, each side frame member having a channel member that extends around at least a portion of a corresponding side frame opening; and
   a side frame panel for each side frame opening with each side frame panel having an insert member that extends around at least a portion of a perimeter of that panel, wherein each side frame panel is positioned in one of the side frame openings so that the corresponding insert and channel members form a seal joint.

14. The structure of claim 13, wherein a maximum height of each side frame panel is no more than one inch.

15. The structure of claim 1, wherein each insert member includes a second groove that extends around at least a portion of the inner perimeter of that insert member, wherein the second groove is configured to attach a bottom cover.

16. The structure of claim 15, wherein the top cover is a sunroof and the bottom cover is a shade.

17. The structure of claim 1, wherein each channel member includes a second groove that extends around at least a portion of a perimeter of that channel member, wherein the second groove is configured to attach a bottom cover.

18. The structure of claim 1, wherein the upper frame member further includes a second channel member that extends around at least a portion of each upper frame opening; and wherein each upper frame panel includes a second insert member that extends around at least a portion of a perimeter of that panel, wherein each upper frame panel is positioned in one of the upper frame openings so that the corresponding second insert and channel members form a second seal joint.

19. The structure of claim 18, wherein the second seal joint is capable of being in a locked or unlocked position.

20. A method of attaching a hard top structure to a vehicle having a roll-bar cage, comprising:

overlaying a frame of the hard top structure to the roll-bar cage, the frame including an upper frame member that defines one or more upper frame openings, the upper frame member having a channel member that extends around at least a portion of each upper frame opening, each channel member having a shaped portion;

positioning each of one or more upper frame panels in a corresponding upper frame opening, each upper frame panel having an insert member that extends around at least a portion of a perimeter of that panel, each insert member having a corresponding shaped portion that is adapted to attach to the corresponding shaped portion of the channel member, and each insert member also having a first groove that extends around at least a portion of an inner perimeter of that insert member with the first groove being configured to attach a top cover; and attaching each upper frame panel to the upper frame member so that the associated insert and channel members form a seal joint.

* * * * *